(12) United States Patent
Li et al.

(10) Patent No.: US 11,463,969 B2
(45) Date of Patent: Oct. 4, 2022

(54) TECHNIQUES FOR CONNECTING A WIRELESS REPEATER TO MULTIPLE BASE STATIONS

(71) Applicant: QUALCOMM Incorporated, San Diego, CA (US)

(72) Inventors: Junyi Li, Chester, NJ (US); Ashwin Sampath, Skillman, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 16/927,900

(22) Filed: Jul. 13, 2020

(65) Prior Publication Data
US 2021/0037486 A1    Feb. 4, 2021

Related U.S. Application Data

(60) Provisional application No. 62/880,915, filed on Jul. 31, 2019.

(51) Int. Cl.
*H04W 56/00*    (2009.01)
*H04B 7/14*    (2006.01)
(Continued)

(52) U.S. Cl.
CPC ........ *H04W 56/001* (2013.01); *H04B 7/0408* (2013.01); *H04B 7/0617* (2013.01);
(Continued)

(58) Field of Classification Search
CPC ... H04W 16/28; H04W 24/08; H04W 56/001; H04B 7/0408; H04B 7/0617; H04B 7/0695
See application file for complete search history.

(56) References Cited

U.S. PATENT DOCUMENTS

2015/0304079 A1*  10/2015  Kim ..................... H04L 5/0016
                                                            370/350
2018/0124718 A1    5/2018  Ng et al.
(Continued)

FOREIGN PATENT DOCUMENTS

| EP | 2637432 A1 | 9/2013 | |
|---|---|---|---|
| WO | WO-2019054709 A1 | 3/2019 | |
| WO | WO-2019195060 A1 * | 10/2019 | .......... H04W 36/305 |

OTHER PUBLICATIONS

International Search Report and Written Opinion—PCT/US2020/041980—ISAEPO—dated Sep. 30, 2020.

*Primary Examiner* — Brian P Cox
(74) *Attorney, Agent, or Firm* — Holland & Hart LLP

(57) ABSTRACT

Methods, systems, and devices for wireless communications are described. A wireless repeater may monitor for transmissions from multiple base stations. For example, a wireless repeater may communicate with a first base station and forward transmissions from the first base station to various user equipment (UEs). Such transmissions may include transmitting synchronization signal blocks (SSBs) for the first base station. The first base station may instruct the wireless repeater to monitor for SSBs from other base stations, where the wireless repeater may indicate the monitoring results in a report to the first base station. Based on the report, the first base station may transmit an indication of a beam pattern to the wireless repeater. The wireless repeater may use the beam pattern for repeating transmissions of SSBs received from the first base station, SSBs received from the second base station, or any combination thereof.

30 Claims, 18 Drawing Sheets

(51) Int. Cl.
  *H04B 7/0408* (2017.01)
  *H04B 7/06* (2006.01)
  *H04W 16/28* (2009.01)
  *H04W 24/08* (2009.01)

(52) U.S. Cl.
  CPC .......... *H04B 7/0695* (2013.01); *H04W 16/28* (2013.01); *H04W 24/08* (2013.01)

(56) References Cited

U.S. PATENT DOCUMENTS

| | | | |
|---|---|---|---|
| 2019/0082438 A1 | 3/2019 | John Wilson et al. | |
| 2019/0182000 A1* | 6/2019 | Futaki | H04L 5/0092 |
| 2020/0022040 A1* | 1/2020 | Chen | H04W 36/0085 |
| 2020/0275297 A1* | 8/2020 | Jung | H04W 24/10 |

* cited by examiner

TECHNIQUES FOR CONNECTING A WIRELESS REPEATER TO MULTIPLE BASE STATIONS

CROSS REFERENCE

The present Application for Patent claims the benefit of U.S. Provisional Patent Application No. 62/880,915 by Li et al., entitled "TECHNIQUES FOR CONNECTING A WIRELESS REPEATER TO MULTIPLE BASE STATIONS," filed Jul. 31, 2019, assigned to the assignee hereof, which is hereby incorporated by reference in its entirety.

FIELD OF DISCLOSURE

The following relates to wireless communications and more specifically to techniques for connecting a wireless repeater to multiple base stations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support the use of wireless repeaters. For example, a wireless repeater may be located between a UE and a base station and may repeat and extend communications between the base station and UE.

SUMMARY

The described techniques relate to improved methods, systems, devices, and apparatuses that support techniques for connecting a wireless repeater to multiple base stations. The described techniques provide for configuring a wireless repeater to monitor for transmissions from multiple base stations, which may enable the wireless repeater to identify and transmit information for different base stations. For example, a wireless repeater may be in communication with a first base station and the wireless repeater may forward transmissions between the first base station and one or more UEs. Such transmissions may include forwarding synchronization signal blocks (SSBs) for the first base station. In some cases, the first base station may instruct the wireless repeater to perform monitoring for one or more other base stations that may be transmitting SSBs. The wireless repeater may accordingly search for SSBs transmitted by the other base station(s), and indicate the search results in a report transmitted to the first base station. In some cases, the monitoring may be performed by the repeater during one or more periodic intervals. In any case, the wireless repeater may indicate whether SSBs were detected during the monitoring. In examples where a second base station is detected via the monitoring, the wireless repeater may include, in the report, information regarding the detected SSBs and identifying the second base station. The first base station may, based on the received report, transmit an indication of a configured beam pattern to the wireless repeater, where the wireless repeater may use the beam pattern for repeating transmissions of SSBs received from the first base station, or SSBs received from the second base station, or any combination thereof.

A method of wireless communication at a wireless repeater is described. The method may include receiving, from a first base station, instructions to monitor for SSBs from a second base station, transmitting, to the first base station, a report indicating that one or more SSBs transmitted from the second base station were detected based on the instructions, and receiving, from the first base station, an indication of a transmission beam pattern for one or more SSBs transmitted from the first base station, the one or more SSBs transmitted from the second base station, or any combination thereof, where the transmission beam pattern is based on the report.

An apparatus for wireless communication at a wireless repeater is described. The apparatus may include a processor, memory coupled with the processor, and instructions stored in the memory. The instructions may be executable by the processor to cause the apparatus to receive, from a first base station, instructions to monitor for SSBs from a second base station, transmit, to the first base station, a report indicating that one or more SSBs transmitted from the second base station were detected based on the instructions, and receive, from the first base station, an indication of a transmission beam pattern for one or more SSBs transmitted from the first base station, the one or more SSBs transmitted from the second base station, or any combination thereof, where the transmission beam pattern is based on the report.

Another apparatus for wireless communication at a wireless repeater is described. The apparatus may include means for receiving, from a first base station, instructions to monitor for SSBs from a second base station, transmitting, to the first base station, a report indicating that one or more SSBs transmitted from the second base station were detected based on the instructions, and receiving, from the first base station, an indication of a transmission beam pattern for one or more SSBs transmitted from the first base station, the one or more SSBs transmitted from the second base station, or any combination thereof, where the transmission beam pattern is based on the report.

A non-transitory computer-readable medium storing code for wireless communication at a wireless repeater is described. The code may include instructions executable by a processor to receive, from a first base station, instructions to monitor for SSBs from a second base station, transmit, to the first base station, a report indicating that one or more SSBs transmitted from the second base station were detected based on the instructions, and receive, from the first base station, an indication of a transmission beam pattern for one or more SSBs transmitted from the first base station, the one or more SSBs transmitted from the second base station, or any combination thereof, where the transmission beam pattern is based on the report.

Some examples of the method, apparatuses, and non-transitory computer-readable medium described herein may further include operations, features, means, or instructions for receiving the one or more SSBs from the first base station, transmitting, to one or more wireless devices, the one or more SSBs from the first base station, the one or more SSBs being transmitted during a set of periodic intervals, and monitoring for the SSBs from the second base station during a monitoring interval based on the instructions.

Some examples of the method, apparatuses, and non-transitory computer-readable medium described herein may further include operations, features, means, or instructions for receiving, as part of the instructions, an indication to refrain from transmitting the one or more SSBs from the first base station during an interval of the set of periodic intervals that overlaps with the monitoring interval.

In some examples of the method, apparatuses, and non-transitory computer-readable medium described herein, the monitoring interval may be non-overlapping with the set of periodic intervals.

Some examples of the method, apparatuses, and non-transitory computer-readable medium described herein may further include operations, features, means, or instructions for determining, based on detecting the one or more SSBs from the second base station, a set of properties associated with the one or more SSBs from the second base station, and transmitting, within the report, an indication of the set of properties associated with the one or more SSBs from the second base station.

In some examples of the method, apparatuses, and non-transitory computer-readable medium described herein, where the set of properties includes a reference signal received power (RSRP) of the one or more SSBs from the second base station, an identity of the second base station, a time offset for signals received from the second base station, or any combination thereof.

Some examples of the method, apparatuses, and non-transitory computer-readable medium described herein may further include operations, features, means, or instructions for identifying a first reception beam used to receive the one or more SSBs transmitted from the first base station during a first set of one or more symbol periods, identifying a second reception beam used to receive the one or more SSBs transmitted from the second base station during a second set of one or more symbol periods, and transmitting, within the report, an indication of the first reception beam, the second reception beam, the first set of one or more symbol periods, the second set of one or more symbol periods, or any combination thereof.

In some examples of the method, apparatuses, and non-transitory computer-readable medium described herein, the transmission beam pattern may be based on the indication of the first reception beam, the second reception beam, the first set of one or more symbol periods, the second set of one or more symbol periods, or any combination thereof.

Some examples of the method, apparatuses, and non-transitory computer-readable medium described herein may further include operations, features, means, or instructions for configuring reception beams of the wireless repeater for receiving, during a set of one or more symbol periods, the one or more SSBs transmitted from the first base station, the one or more SSBs transmitted from the second base station during a second set of one or more symbol periods, or any combination thereof, where the configured reception beams may be based on the indication of the transmission beam pattern.

Some examples of the method, apparatuses, and non-transitory computer-readable medium described herein may further include operations, features, means, or instructions for detecting one or more additional SSBs from the first base station based on the instructions, and transmitting, within the report, an indication of the one or more additional SSBs from the first base station.

Some examples of the method, apparatuses, and non-transitory computer-readable medium described herein may further include operations, features, means, or instructions for detecting the one or more SSBs from the second base station based on the instructions, and performing an initialization procedure to connect with the second base station based on the detected the one or more SSBs from the second base station.

In some examples of the method, apparatuses, and non-transitory computer-readable medium described herein, transmitting the report may include operations, features, means, or instructions for transmitting the report in a portion of a bandwidth used to receive the one or more SSBs from the first base station.

In some examples of the method, apparatuses, and non-transitory computer-readable medium described herein, transmitting the report may include operations, features, means, or instructions for transmitting the report in a first bandwidth that may be different from a second bandwidth used to receive the one or more SSBs from the first base station.

In some examples of the method, apparatuses, and non-transitory computer-readable medium described herein, receiving the instructions may include operations, features, means, or instructions for receiving, from the first base station, control information including the instructions, where the control information may be received in a portion of a bandwidth used to receive the one or more SSBs from the first base station.

In some examples of the method, apparatuses, and non-transitory computer-readable medium described herein, receiving the instructions may include operations, features, means, or instructions for receiving, from the first base station, control information including the instructions, where the control information may be received in a first bandwidth that may be different from a second bandwidth used to receive the one or more SSBs from the first base station.

In some examples of the method, apparatuses, and non-transitory computer-readable medium described herein, the transmission beam pattern corresponds to symbol periods during which the one or more SSBs from the first base station may be transmitted, the one or more SSBs from the second base station may be transmitted, or any combination thereof.

A method of wireless communication at a base station is described. The method may include transmitting, to a wireless repeater, instructions to monitor for SSBs from a second base station, receiving, from the wireless repeater, a report indicating that one or more SSBs transmitted from the second base station were detected based on the instructions, and transmitting, to the wireless repeater, an indication of a transmission beam pattern for one or more SSBs transmitted from the first base station, the one or more SSBs transmitted from the second base station, or any combination thereof, where the transmission beam pattern is based on the report.

An apparatus for wireless communication at a base station is described. The apparatus may include a processor, memory coupled with the processor, and instructions stored in the memory. The instructions may be executable by the processor to cause the apparatus to transmit, to a wireless repeater, instructions to monitor for SSBs from a second base station, receive, from the wireless repeater, a report indicating that one or more SSBs transmitted from the second base station were detected based on the instructions, and transmit, to the wireless repeater, an indication of a transmission beam pattern for one or more SSBs transmitted from the first base station, the one or more SSBs transmitted from the second base station, or any combination thereof, where the transmission beam pattern is based on the report.

Another apparatus for wireless communication at a base station is described. The apparatus may include means for transmitting, to a wireless repeater, instructions to monitor for SSBs from a second base station, receiving, from the wireless repeater, a report indicating that one or more SSBs transmitted from the second base station were detected based on the instructions, and transmitting, to the wireless repeater, an indication of a transmission beam pattern for one or more SSBs transmitted from the first base station, the one or more SSBs transmitted from the second base station, or any combination thereof, where the transmission beam pattern is based on the report.

A non-transitory computer-readable medium storing code for wireless communication at a base station is described. The code may include instructions executable by a processor to transmit, to a wireless repeater, instructions to monitor for SSBs from a second base station, receive, from the wireless repeater, a report indicating that one or more SSBs transmitted from the second base station were detected based on the instructions, and transmit, to the wireless repeater, an indication of a transmission beam pattern for one or more SSBs transmitted from the first base station, the one or more SSBs transmitted from the second base station, or any combination thereof, where the transmission beam pattern is based on the report.

Some examples of the method, apparatuses, and non-transitory computer-readable medium described herein may further include operations, features, means, or instructions for determining, based on the report, a synchronization signal block pattern for the one or more SSBs transmitted from the first base station, the one or more SSBs transmitted from the second base station, or any combination thereof, where the transmission beam pattern corresponds to the synchronization signal block pattern.

In some examples of the method, apparatuses, and non-transitory computer-readable medium described herein, determining the synchronization signal block pattern may include operations, features, means, or instructions for communicating with the second base station to configure the synchronization signal block pattern based on the report.

Some examples of the method, apparatuses, and non-transitory computer-readable medium described herein may further include operations, features, means, or instructions for configuring a monitoring interval to monitor for the SSBs from the second base station, and transmitting, within the instructions, an indication of the monitoring interval.

Some examples of the method, apparatuses, and non-transitory computer-readable medium described herein may further include operations, features, means, or instructions for determining a set of periodic intervals the wireless repeater uses for transmitting the one or more SSBs from the first base station, identifying a collision between an interval of the set of periodic intervals and the monitoring interval, and transmitting, as part of the instructions, an indication to refrain from transmitting the one or more SSBs from the first base station during the interval based on the identified collision.

Some examples of the method, apparatuses, and non-transitory computer-readable medium described herein may further include operations, features, means, or instructions for determining a set of periodic intervals the wireless repeater uses for transmitting the one or more SSBs from the first base station, where the monitoring interval may be non-overlapping with the set of periodic intervals.

Some examples of the method, apparatuses, and non-transitory computer-readable medium described herein may further include operations, features, means, or instructions for receiving, within the report, an indication of a set of properties associated with the one or more SSBs from the second base station.

In some examples of the method, apparatuses, and non-transitory computer-readable medium described herein, the set of properties includes a reference signal received power of the one or more SSBs from the second base station, an identity of the second base station, a time offset for signals received from the second base station, or any combination thereof.

Some examples of the method, apparatuses, and non-transitory computer-readable medium described herein may further include operations, features, means, or instructions for receiving, within the report, an indication of a first reception beam and a first set of one or more symbol periods for receiving the one or more SSBs transmitted from the first base station and an indication of a second reception beam and a second set of one or more symbol periods for receiving the one or more SSBs transmitted from the second base station, and determining the transmission beam pattern based on the indication of the first reception beam, the second reception beam, the first set of one or more symbol periods, the second set of one or more symbol periods, or any combination thereof.

In some examples of the method, apparatuses, and non-transitory computer-readable medium described herein, receiving the report may include operations, features, means, or instructions for receiving the report in a portion of a bandwidth used to transmit the one or more SSBs to the wireless repeater.

In some examples of the method, apparatuses, and non-transitory computer-readable medium described herein, receiving the report may include operations, features, means, or instructions for receiving the report in a first bandwidth that may be different from a second bandwidth used to transmit the one or more SSBs to the wireless repeater.

In some examples of the method, apparatuses, and non-transitory computer-readable medium described herein, transmitting the instructions may include operations, features, means, or instructions for transmitting control information including the instructions, where the control information may be transmitted in a portion of a bandwidth used to transmit the one or more SSBs to the wireless repeater.

In some examples of the method, apparatuses, and non-transitory computer-readable medium described herein, transmitting the instructions may include operations, features, means, or instructions for transmitting control information including the instructions in a first bandwidth that may be different from a second bandwidth used to transmit the one or more SSBs to the wireless repeater.

In some examples of the method, apparatuses, and non-transitory computer-readable medium described herein, the transmission beam pattern corresponds to symbol periods during which the one or more SSBs from the first base station may be transmitted, the one or more SSBs from the second base station may be transmitted, or any combination thereof.

DETAILED DESCRIPTION

Figure 1:
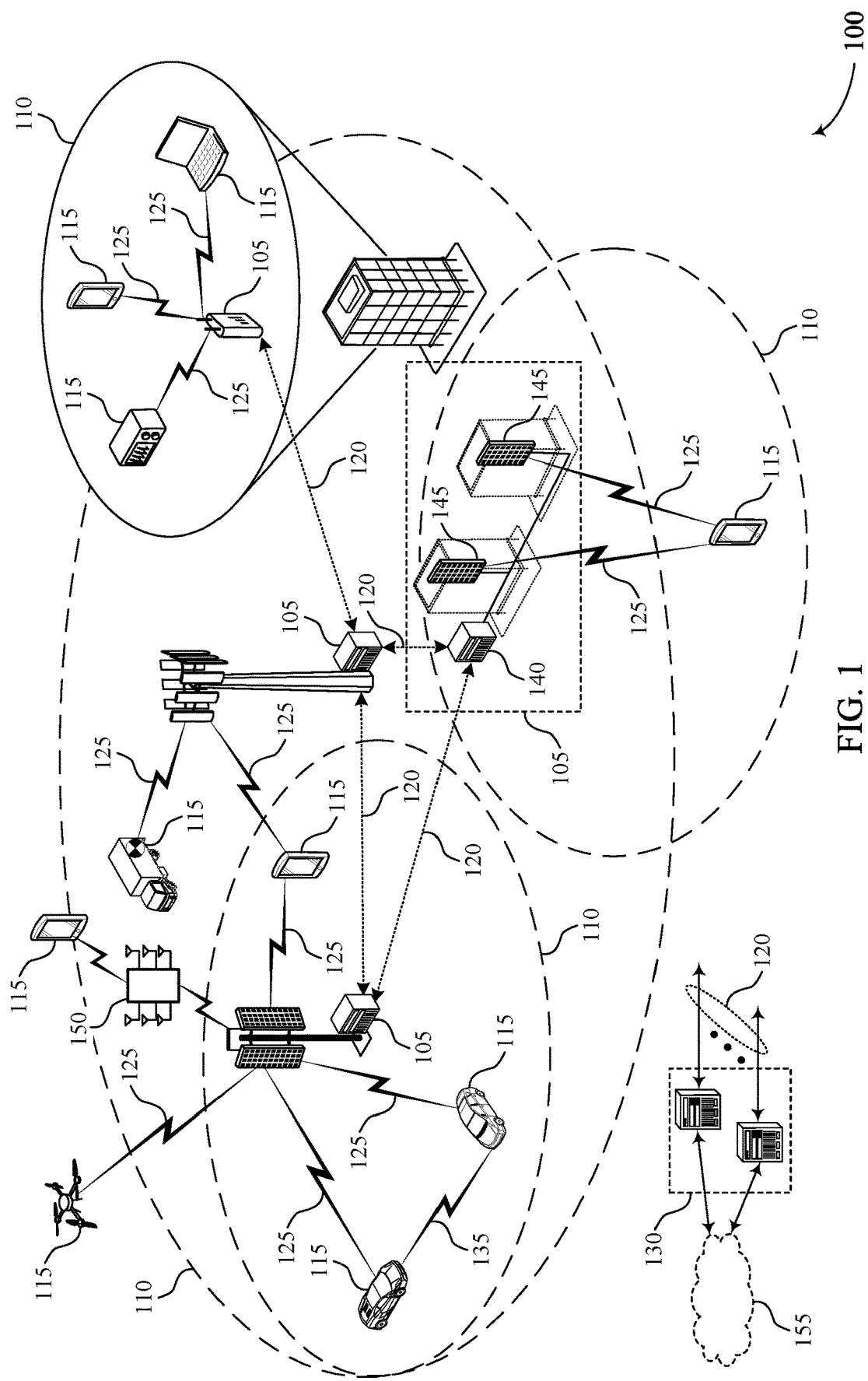
FIG. 1 illustrates an example of a wireless communications system that supports techniques for connecting a wireless repeater to multiple base stations in accordance with various aspects of the present disclosure.

In a wireless communications system, a base station may communicate with a user equipment (UE) over a wireless link. For instance, base stations and UEs may operate in millimeter wave (mmW) frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage by physical objects, etc. As a result, signal processing techniques, such as beamforming, may be used to coherently combine energy and overcome the pathlosses at these frequencies. However, the transmission of a signal (such as a beamformed signal) between the base station and the UE may not be possible or may be interfered with due to a physical barrier or a radio frequency (RF) jammer. In these cases, a repeating device (e.g., a wireless repeater, a mmW repeater, or the like) may be used to extend, repeat, or relay the transmission from the base station to the UE, and vice versa, thereby enabling efficient communications in the presence of RF jammers.

In some cases, a wireless repeater may be controlled by a base station that indicates how the repeater is to communicate with one or more UEs and the base station. The base station may provide control signaling that indicates, for example, a beam (e.g., a directional beam or symbol period associated with a beam), a communication direction (e.g., uplink, downlink) for transmissions, or other types of information the repeater may use to communicate with the base station and the UEs.

In some systems, a wireless repeater may be near multiple base stations that are each connected to a respective set of one or more UEs. In such cases, it may be beneficial for the wireless repeater to connect to, and communicate with, multiple base stations. For instance, the wireless repeater may forward transmissions (e.g., including synchronization signal blocks (SSBs)) from multiple base stations to enhance coverage for one or more UEs. In other examples, communications conditions between the wireless repeater and a controlling base station may dynamically change, and another base station may more efficiently serve UEs within the cell. As such, it may be beneficial for the repeater to communicate with a different base station to provide service for various UEs.

As described herein, a base station may instruct a repeater to search for SSBs from other base stations, where the base station may configure the repeater based on detected SSBs. For instance, the wireless repeater may be connected to and repeat transmissions (e.g., SSBs) for a first base station. The wireless repeater may be instructed to perform a search for SSBs from one or more other wireless devices, which may include other base stations. The repeater may transmit a report to the first base station that indicates whether the repeater detected SSBs from other base stations. Upon the detection of one or more SSBs from another base station(s), the report may include information regarding the detected SSBs, including a timing information, information regarding the base station that transmitted the SSBs, information regarding the signal quality of the SSBs, or the like. The first base station may, in response to the report, configure a beam pattern for the repeater, where the beam pattern may inform the repeater to transmit SSBs from the first base station, SSBs from the second base station, or both, during a set of symbol periods in accordance with the beam pattern. In this way, the repeater may be configured by a single base station to repeat/retransmit the transmission of SSBs from multiple base stations, thereby enhancing coverage of multiple cells and improving service for various UEs.

Aspects of the disclosure are initially described in the context of wireless communications systems. Further examples are then described with reference to additional wireless communications systems and a process flow that illustrate the configuration of a wireless repeater to identify multiple base stations. Aspects of the disclosure are further illustrated by and described with reference to apparatus diagrams, system diagrams, and flowcharts that relate to techniques for connecting a wireless repeater to multiple base stations.

FIG. 1 illustrates an example of a wireless communications system 100 that supports techniques for connecting a wireless repeater to multiple base stations in accordance with various aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. In some examples, base station 105 may wirelessly communicate with one or more wireless repeaters 150 (e.g., repeating devices, repeaters, or other like terminology) that may support the retransmission, amplification, frequency translation, etc. of signaling to one or more other devices, such as a UE 115. Similarly, a repeater may be used to retransmit signaling from a UE 115 to a base station 105.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum and, in some examples, the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

A wireless device (such as a UE 115, a wireless repeater 150, or the like) attempting to access a wireless network may perform an initial cell search by detecting a primary synchronization signal (PSS) from a base station 105. The PSS may enable synchronization of slot timing and may indicate a physical layer identity value. The wireless device may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. In some cases, a base station 105 may transmit synchronization signals (e.g., PSS SSS, and the like) using multiple beams in a beam-sweeping manner through a cell coverage area. In some cases, PSS, SSS, or broadcast information (e.g., a physical broadcast channel (PBCH)) may be transmitted within different SSBs on respective directional beams, where one or more SSBs may be included within a synchronization signal burst.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, a wireless repeater 150 may be an MTC or IoT device that is controlled by a base station 105 or UE 115 via a low-band or NB-IoT connection and performs repeating of received signals without demodulation or decoding of such signals based on control information provided by the low-band or NB-IoT connection.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 155. The operators IP services 155 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may include one or more wireless repeaters 150 (e.g., wireless repeaters 150). Wireless repeaters 150 may include functionality to repeat, extend, and redirect wireless signals transmitted within a wireless communications system. In some cases, wireless repeaters 150 may be used in line-of-sight (LOS) or non-line-of-sight (NLOS) scenarios. In an LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless repeater 150 may be used to receive a signal from a base station 105 and transmit a signal to UE 115, or receive a signal from a UE 115 and transmit the signal to the base station 105. Beamforming, filtering, gain control, and phase correction techniques may be utilized by the wireless repeater 150 to improve signal quality and avoid RF interference with the transmitted signal.

Wireless communications system 100 may support the configuration of a wireless repeater 150 to monitor for transmissions from multiple base stations 105, which may enable the wireless repeater 150 to identify and transmit information for different base stations 105. For example, a wireless repeater 150 may be in communication with a first base station 105 and the wireless repeater 150 may forward transmissions between the first base station 105 and one or more UEs 115. Such transmissions may include forwarding SSBs for the first base station 105 (e.g., forwarding, to one or more other devices, SSBs that were transmitted by the first base station 105 and received by the wireless repeater 150). In some cases, the first base station 105 may instruct the wireless repeater 150 to perform monitoring for one or more other base stations 105 that may be transmitting SSBs. The wireless repeater 150 may accordingly search for SSBs transmitted by the other base station(s) 105, and indicate the search results in a report transmitted to the first base station 105. In some cases, the monitoring may be performed by the wireless repeater 150 during one or more periodic intervals. In examples where the periodic monitoring intervals may collide with repeated transmissions of SSBs on behalf of the first base station 105, the first base station 105 may indicate that the wireless repeater 150 may temporarily stop transmissions of the SSBs to perform the monitoring. In any case, the wireless repeater 150 may indicate whether SSBs were detected during the monitoring. In examples where a second base station 105 is detected via the monitoring, the wireless repeater 150 may transmit the report including information regarding the detected SSBs and information identifying the second base station 105. The first base station 105 may, based on the received report, transmit an indication of a configured beam pattern to the wireless repeater 150, and the wireless repeater 150 may then use the beam pattern for repeating transmissions of SSBs received from the first base station 105, or SSBs received from the second base station 105, or a combination thereof.

Figure 2:
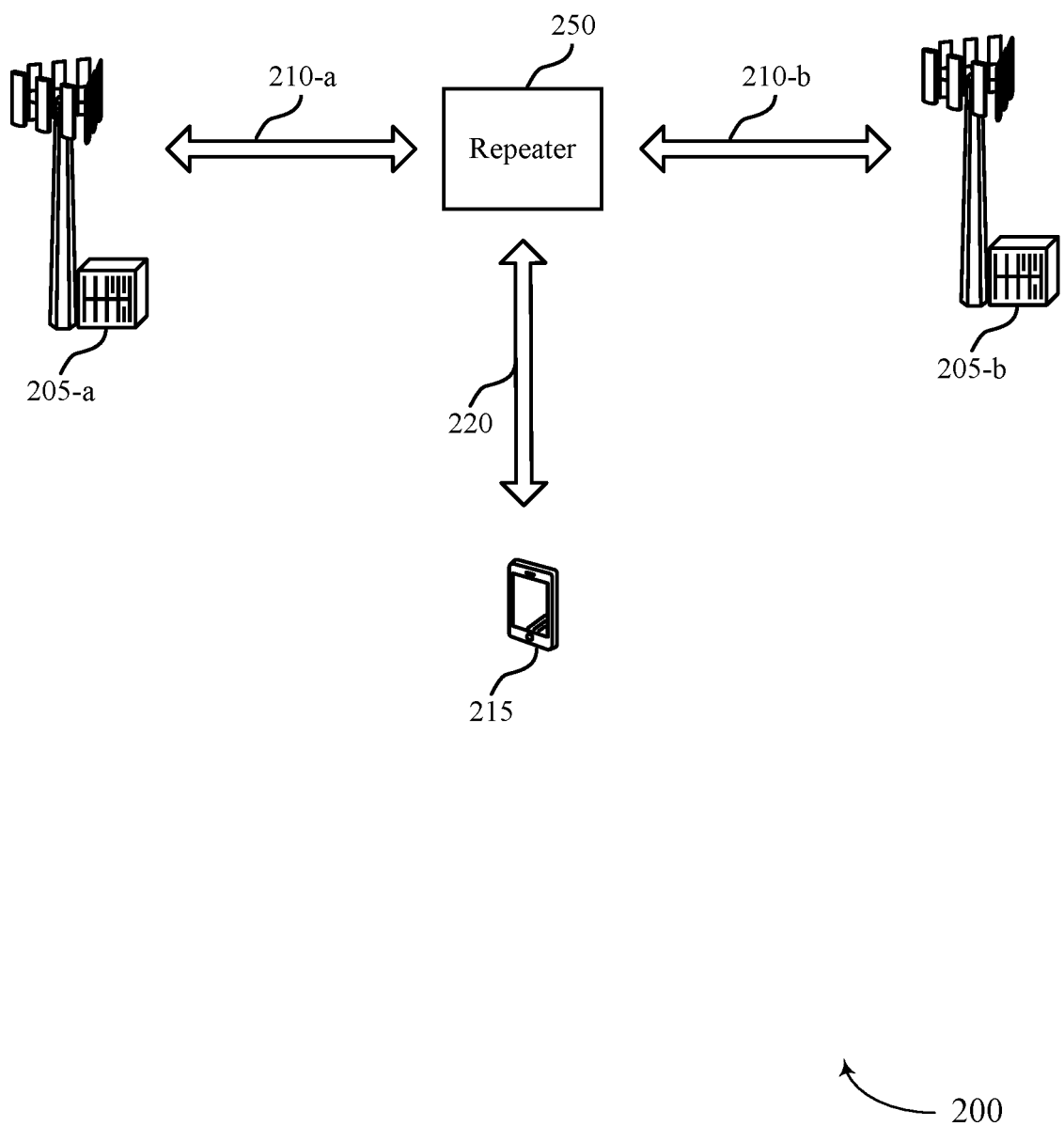
FIGS. 2 through 4 illustrate examples of wireless communications systems that support techniques for connecting a wireless repeater to multiple base stations in accordance with various aspects of the present disclosure.

FIG. 2 illustrates an example of a wireless communications system 200 that supports techniques for connecting a wireless repeater to multiple base stations in accordance with various aspects of the present disclosure. In some examples, wireless communications system 200 may implement aspects of wireless communications system 100. As shown, wireless communications system 200 includes base station 205-a and base station 205-b, which may be examples of the corresponding devices described with reference to FIG. 1. Wireless communications system 200 further includes UE 215 and wireless repeater 250, which may be examples of the corresponding devices described with reference to FIG. 1.

In wireless communications system 200, base station 205-a may connect to a wireless repeater 250. For example, base station 205-a may send transmissions (e.g., SSBs transmitted over directional beams) via communication link 210-a to wireless repeater 250. In some examples, an SSB may be transmitted in respective symbol periods, and each symbol period and SSB may correspond to a different beam direction. Wireless repeater 250 may amplify and forward the SSBs it receives over the directional beams and during corresponding symbols to other devices in wireless communications system 200, including UE 215. In some examples, wireless repeater 250 may not receive any SSBs over some symbols due to SSB beams (e.g., beams used to transmit SSBs) being transmitted in a direction outside the detection range of wireless repeater 250. During time intervals of not receiving SSBs (or other transmissions), wireless repeater 250 may go into a power saving mode.

In some cases, wireless repeater 250 may be provided with instructions to search for and identify nearby base stations 205 that wireless repeater 250 may not have previously detected (e.g., a new base station installed). In other cases, base station 205-a may determine that one or more UEs (e.g., UE 215) may be better served if wireless repeater 250 forwards signaling from another base station (e.g., base station 205-b). For instance, mmW communications may be affected by various factors, including trees and buildings, as well as weather effects. Thus, base station 205-a may dynamically determine whether wireless repeater 250 is to search for other base stations.

As a result, wireless repeater 250 may be triggered to search for SSB beams from other base stations. Base station 205-a may instruct wireless repeater 250 to search for SSBs during time intervals when wireless repeater 250 may not be receiving or forwarding SSB beams from base station 205-a. Additionally or alternatively, searching for SSBs may be performed during a time interval when wireless repeater 250 may be receiving or forwarding a relatively low number of SSB beams from base station 205-a (e.g., a number of SSBs being transmitted that is less than a threshold amount). In any case, base station 205-a may instruct wireless repeater 250 to perform a periodic search (e.g., during a periodic time interval, such as every second) or an aperiodic search (e.g., base station 205-a may indicate a search be performed by wireless repeater 250 when a new base station 205 is installed for the network).

In some examples, base station 205-a may instruct wireless repeater 250 to stop forwarding SSB beams during some time intervals (e.g., asynchronous or synchronous time intervals) and perform an SSB search. As an example, base station 205-a may determine that a configured period for monitoring for other SSBs may collide with one or more time periods during which wireless repeater 250 transmits SSBs for base station 205-a. Accordingly, base station 205-a may prioritize the monitoring for SSBs (and identification of other base stations 205) over the transmission of SSBs from base station 205-a, and provide the instruction for the monitoring or searching to wireless repeater 250 based on the prioritization.

Base station 205-a may send the instruction to wireless repeater 250 via a control interface (e.g., in-band or out-of-band control interface). Here, an in-band control interface may include control information signaled within a portion of a wideband (e.g., wide signal bandwidth) transmission, which may include a BWP of the wideband bandwidth. In some cases, the wideband bandwidth may be the same bandwidth wireless repeater 250 uses to communicate with base station 205-a (e.g., for receiving SSBs). An out-of-band control interface may refer to control signaling transmitted over a different bandwidth or RF spectrum band than is used to transmit/receive the SSBs, where the control signaling may be sent to wireless repeater 250 separate from other transmissions. In some examples, wireless repeater 250 may not convert received signaling to baseband and digitize the signal for processing, and wireless repeater 250 instead may pass the signal through various components, for example, as an RF analog signal. Wireless repeater 250 may convert the signal to an intermediate frequency (IF) signal. The signaling from base station 205-a may include control information and data to exchange between base station 205-a and wireless repeater 250.

In some cases, wireless repeater 250 may process the wideband RF analog signal and extract a narrowband signal which may be in a pre-determined BWP of the wideband signal bandwidth. Base station 205-a may change the frequency location of the BWP through the control interface. Wireless repeater 250 may digitally process the narrowband signal and retrieve control (e.g., physical) information from the base station 205-a, where the control information may relate to the selection of beams in the uplink or downlink signal direction of the intended wideband RF analog signal. In some cases, control information may include power control, timing control, power saving, or beam weights. Wireless repeater 250 may use the control information received in the control interface to set beam and signal directions.

Wireless repeater 250 may identify SSB beams from base station 205-b and begin to communicate over communication link 210-b with base station 205-b. In some examples, wireless repeater 250 may carry out an initialization procedure (e.g., a random access procedure) to connect with base station 205-b. In such cases, wireless repeater 250 may indicate to base station 205-b that wireless repeater 250 is in communication with base station 205-a. In some examples, wireless repeater 250 may detect additional SSBs (and their corresponding beams) from base station 205-a in addition to, or instead of, SSBs of base station 205-b. In some examples, wireless repeater 250 may not detect additional SSB beams form base station 205-a or may not detect any SSB beams from other base stations 205 or wireless devices.

In some cases, wireless repeater 250 may report the SSB search results to base station 205-a via the control interface. The SSB search results may indicate additional SSB beams from base station 205-a, SSB beams from base station 205-b, or may report no SSB beams from other base stations or wireless devices. In some cases, for any SSBs that were detected by wireless repeater 250, the report may also include an RSRP, base station identification (ID), time offset of detected base stations (e.g., base station 205-b), or any combination thereof. As an example, the time offset of base station 205-b may include which SSB symbols from base station 205-b affect SSB symbols from base station 205-a in the time domain (e.g., which SSB symbols overlap between the base stations). As described in further detail herein, base station 205-a may utilize the information included in the report to configure a beam pattern used by wireless repeater 250 for repeating transmissions of SSBs.

For example, wireless repeater 250 may forward transmissions (e.g., SSBs) from base station 205-a to various UEs (e.g., including UE 215) over communication link 220. In some cases, wireless repeater 250 may forward SSBs from base station 205-a to UE 215 and switch to forward SSBs from base station 205-b to UE 215. In some examples, wireless repeater 250 may receive SSBs from both base station 205-a and base station 205-b, and may transmit these SSBs based on the configured beam pattern, where each beam used by wireless repeater 250 may be used for transmitting respective SSBs from base station 205-a or base station 205-b. As such, base station 205-a and base station 205-b may coordinate the pattern for transmitting SSBs during respective symbols to avoid conflict with any overlapping or colliding SSB symbols of base station 205-a and base station 205-b. In some examples, base station 205-a may instruct wireless repeater 250 to ignore SSB symbols from base station 205-b which conflict with SSB symbols from base station 105-a.

In some examples, wireless repeater 250 may indicate, via the report, which beams are used to receive SSBs from different base stations (e.g., from base station 205-b). Additionally, wireless repeater 250 may provide an indication of symbol period (or other time periods) during which wireless repeater 250 received the SSBs. As an example, wireless repeater 250 may be connected to base station 205-a, and wireless repeater 250 may identify a first directional beam (e.g., a first receive beam) for receiving SSBs from base station 205-a. The SSBs on the first directional beam may be received during one or more symbol periods (e.g., a first symbol period and a second symbol period). Upon receiving instructions to monitor for SSBs from other base stations 205, wireless repeater 250 may detect one or more SSBs from base station 205-b and identify a second directional beam (e.g., a second receive beam) for receiving the one or more SSBs for base station 205-b. In such cases, the one or more SSBs from base station 205-b may be received during a third symbol period and a fourth symbol period. Wireless repeater 250 may then transmit an indication that the SSBs from base station 205-a were received on the first receive beam during the first symbol period and the second symbol period, in addition to an indication of receiving SSBs from base station 205-b on the second receive beam during the third symbol period and the fourth symbol period. Accordingly, base station 205-a may instruct wireless repeater 250 (e.g., through a configured beam pattern) to amplify and forward the SSBs received from base station 205-a and from base station 205-b based on the indicated beams used to receive the respective SSBs during the indicated symbol periods. As a result, the indication of the configured beam pattern transmitted to wireless repeater 250 may instruct wireless repeater 250 as to which receive beam(s) to use for respective symbol time periods (e.g., symbols) when detecting signals transmitted by multiple base stations 205. As a result, wireless repeater 250 may configure its directional beams in accordance with the indicated beam pattern for communicating with base station 205-a and base station 205-b.

Figure 3:
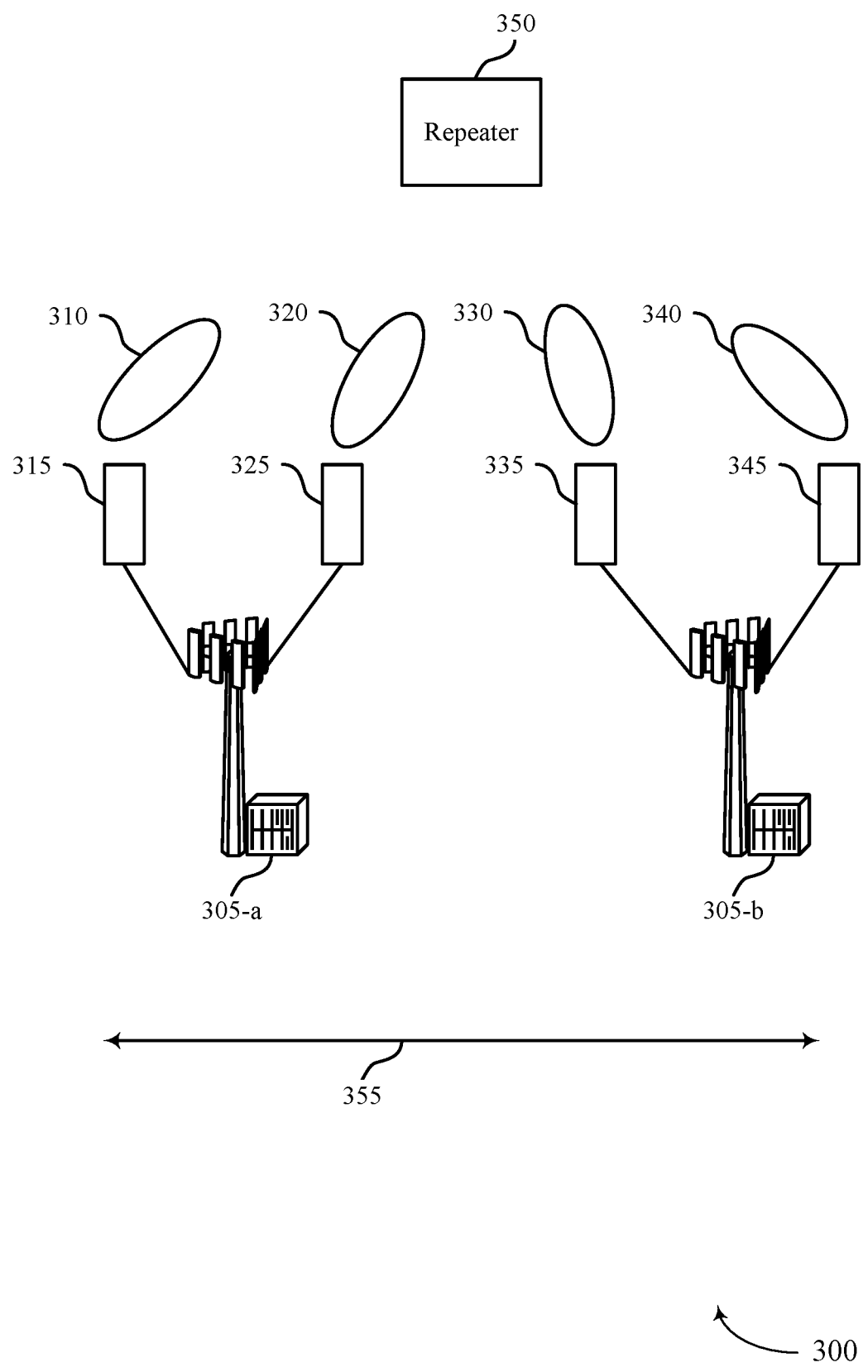

FIG. 3 illustrates an example of a wireless communications system 300 that supports techniques for connecting a wireless repeater to multiple base stations in accordance with various aspects of the present disclosure. In some examples, wireless communications system 300 may implement aspects of wireless communications system 100 or wireless communications system 200. As shown, wireless communications system 300 includes base station 305-a, base station 305-b, and wireless repeater 350 which may be examples of the corresponding devices described with reference to FIG. 1 and FIG. 2.

In wireless communications system 300, base station 305-a may instruct wireless repeater 350 to perform an SSB beam search, where wireless repeater 350 may monitor for SSBs transmitted from a base station 305 that is different from the base station 305 that is connected to wireless repeater 350. As an example, wireless repeater 350 may detect SSB beam 310 in symbol 315 and SSB beam 320 in symbol 325 from base station 305-a. In some cases, wireless repeater 350 may also detect SSB beam 330 in symbol 335 and SSB beam 340 in symbol 345 from base station 305-b. In some examples, the SSBs received in symbol 315, symbol 325, symbol 335, and symbol 345 may be received during a periodic interval 355.

In some examples, wireless repeater 350 may report the search results to base station 305-a. Wireless repeater 350 may report to base station 305-a the presence of base station 305-b. Wireless repeater 350 may also report to base station 305-a a time offset between the symbol 335 and the symbol 345 for SSBs transmitted by base station 305-b, as well as for the symbol 315 and the symbol 325 used to receive SSBs from base station 305-a. In some examples, wireless repeater 350 may report to base station 305-a that there is no overlap of SSB beams between the symbol 335 and the symbol 345 of base station 305-b and the SSB beams for the symbol 315 and the symbol 325 from base station 305-a. Base station 305-a may instruct wireless repeater 350 to forward SSB beam 330 and SSB beam 340 generated from base station 305-b based on the search results report.

In some cases, wireless repeater 350 may switch between forwarding SSB beams from base station 305-a and base station 305-*b*. For instance, wireless repeater 350 may forward SSB beam 310 (corresponding to symbol 315) and SSB beam 320 (corresponding to symbol 325) from base station 305-*a*. Wireless repeater 350 may then switch and forward SSB beam 310 (corresponding to symbol 315) and SSB beam 320 (corresponding to symbol 325) from base station 305-*b*. The transmission of SSB beam 310, SSB beam 320, SSB beam 330, and SSB beam 340 may comprise or be in accordance with a beam pattern.

Figure 4:
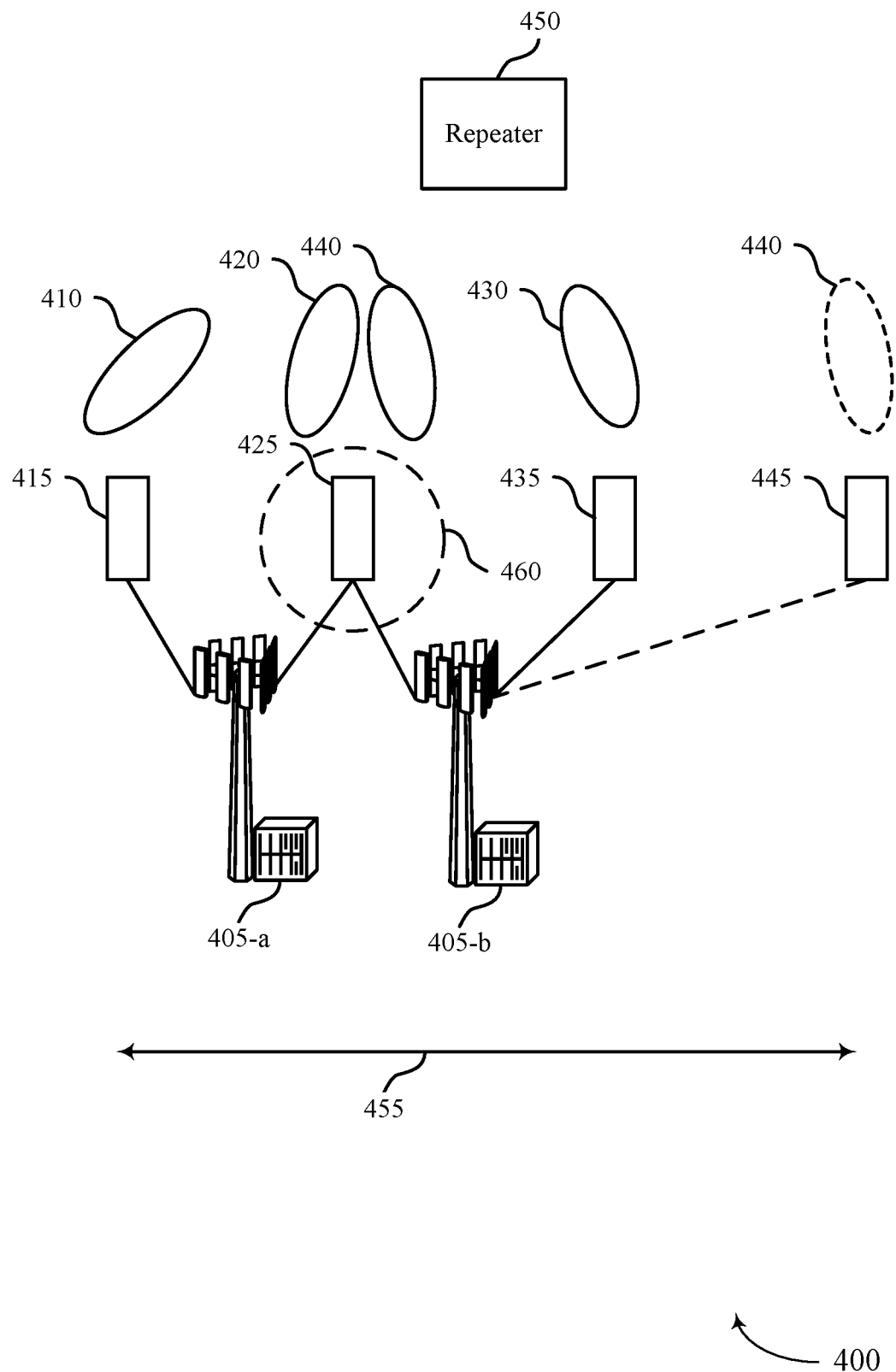

FIG. 4 illustrates an example of a wireless communications system 400 that supports techniques for connecting a wireless repeater to multiple base stations in accordance with various aspects of the present disclosure. In some examples, wireless communications system 400 may implement aspects of wireless communications system 100, wireless communications system 200, or wireless communications system 300. As shown, wireless communications system 400 includes base stations 405-*a*, base station 405-*b*, and wireless repeater 450 which may be examples of the corresponding devices described with reference to FIGS. 1 through 3. Wireless communications system 400 may illustrate various beam patterns used by wireless repeater 450 for transmissions of SSBs, which may be based on directional beams used for receiving SSBs during a monitoring period.

In wireless communications system 400, base station 405-*a* may instruct wireless repeater 450 to perform an SSB beam search (e.g., a search for transmissions of SSBs sent via directional beams from another device). As a result of monitoring during the performed search, wireless repeater 450 may detect SSB beam 410 in symbol 415 and SSB beam 420 in symbol 425 from base station 405-*a*. Wireless repeater 450 may also detect SSB beam 440 in symbol 425 and SSB beam 430 in symbol 435 from base station 405-*b*. In some examples, the SSBs transmitted during symbol 415, symbol 425, symbol 435, and symbol 445 may be detected at wireless repeater 450 during a periodic monitoring interval 455.

As described herein, wireless repeater 450 may report the search results to base station 405-*a*. Wireless repeater 450 may report to base station 405-*a* the presence of base station 405-*b*, and wireless repeater 450 may also determine that SSB beam 420 and SSB beam 440 were received during the same symbol period (e.g., symbol 425). Thus, wireless receiver 450 may report, to base station 405-*a*, an overlap 460 (e.g., a collision) of SSB beam 420 and SSB beam 440 at symbol 425.

In some cases, the overlap 460 may cause a conflict for wireless repeater 450, as wireless repeater 450 may not be able to simultaneously repeat transmissions of SSBs in the directions corresponding to SSB beam 420 and SSB beam 440. As such, base station 405-*a* and base station 405-*b* may coordinate to configure a beam pattern used by wireless repeater 450 to shift the order of the SSB beam 420 and SSB beam 440 to avoid the conflict. For instance, base station 405-*b* may switch SSB beam 440 from symbol 425 to symbol 445. In other cases, base station 405-*a* may instruct wireless repeater 450 to disregard SSB beam 440 from base station 405-*b* and forward SSB beam 420 from base station 405-*a*.

Figure 5:
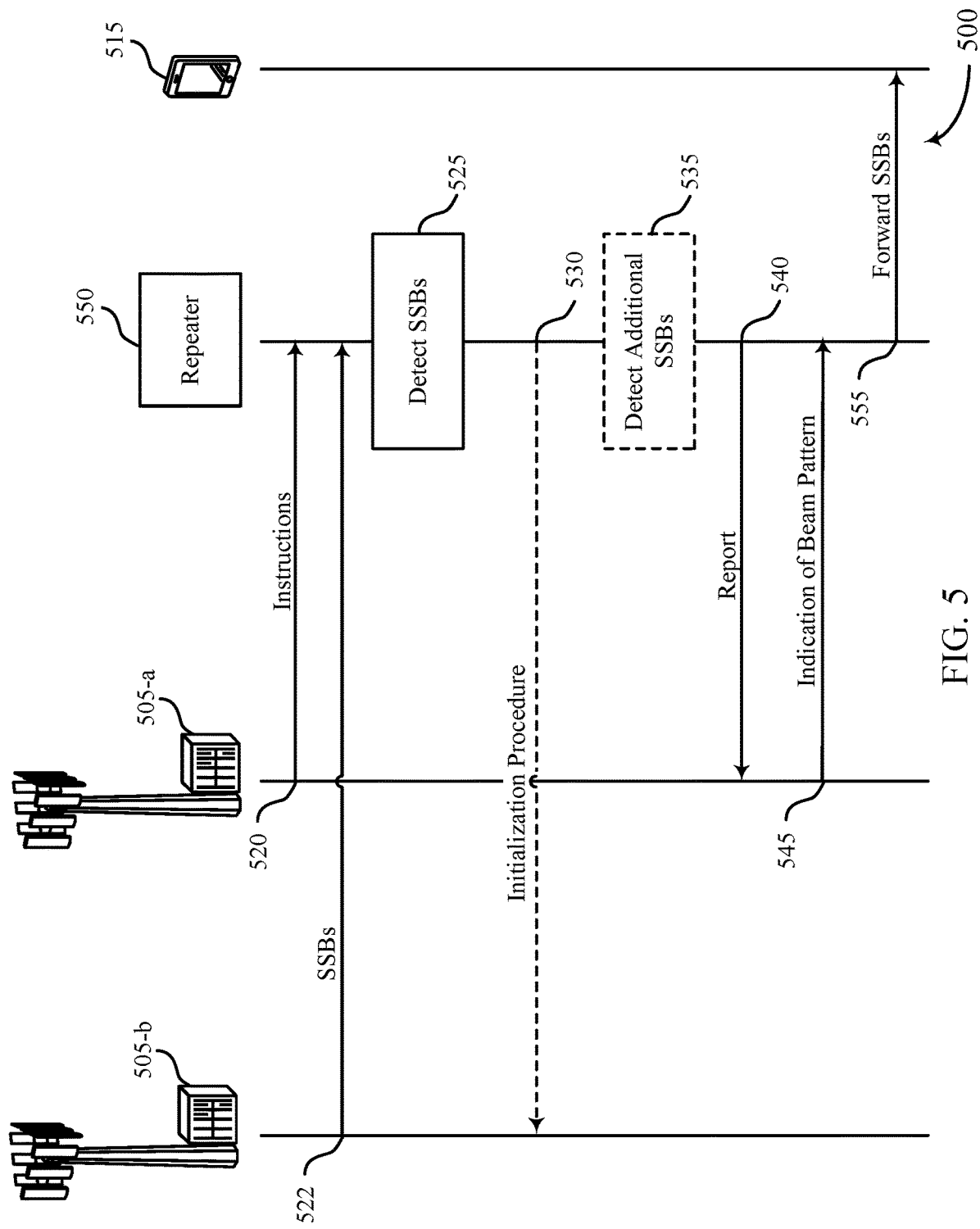
FIG. 5 illustrates an example of a process flow in a system that supports techniques for connecting a wireless repeater to multiple base stations in accordance with various aspects of the present disclosure.

FIG. 5 illustrates an example of a process flow 500 in a system that supports techniques for connecting a wireless repeater to multiple base stations in accordance with various aspects of the present disclosure. In some examples, process flow 500 may implement aspects of wireless communications systems 100, wireless communications system 200, wireless communications system 300, or wireless communications system 400. For example, process flow 500 may include base station 505-*a*, base station 505-*b*, UE 515, and wireless repeater 550, which may be examples of the corresponding devices described with reference to FIGS. 1 through 4.

In some cases, wireless repeater 550 may be in communication with base station 505-*a*, and wireless repeater 550 may forward transmissions of SSBs that wireless repeater 550 receives from base station 505-*a* (e.g., to UE 515). The SSBs transmitted on behalf of base station 505-*a* may be sent during a set of periodic intervals. At 520, base station 505-*a* may transmit instructions to wireless repeater 550 to monitor for SSBs from base station 505-*b*. The instructions may include an indication of a monitoring time interval for wireless repeater 550 to monitor for SSBs. The instructions may also include an indication to refrain from transmitting (e.g., forwarding) SSBs from base station 505-*a* to other wireless devices. In such cases, the monitoring time interval may overlap with the set of periodic intervals. In other cases, the monitoring time interval may not overlap with the set of periodic intervals, and wireless repeater 550 may both monitor for other SSBs (e.g., from base station 505-*b*) and forward the SSB received from base station 505-*a*. In some examples, the instructions may include control information that wireless repeater 550 receives in a bandwidth which is the same as or different from the bandwidth used to receive SSBs from base station 505-*a*.

At 522, base station 505-*b* may transmit one or more SSBs, which may be received by wireless repeater 550. As such, at 525, wireless repeater 550 may detect the SSBs transmitted from base station 505-*b* at 522. In some cases, wireless repeater 550 may detect a set of properties associated with the SSBs of base station 505-*b*. The set of properties may include, for example, an RSRP associated with the SSBs, or an ID of base station 505-*b*, or a time offset of signals received from base station 505-*b*, or a combination thereof. At 530, wireless repeater 550 may optionally perform an initialization procedure to connect with the base station 505-*b* based on the received SSBs. Additionally or alternatively, at 535, wireless repeater 550 may detect additional SSBs from base station 505-*a*.

At 540, wireless repeater 550 may transmit, to base station 505-*a*, a report indicating the SSBs from the base station 505-*b*. The report may also include an indication of the additional SSBs from base station 505-*a* at 535, if any. Wireless repeater 550 may transmit the report in a portion of the bandwidth used to receive SSBs from base station 505-*a* or a portion of the bandwidth different from the bandwidth used to receive SSBs from base station 505-*a*.

At 545, base station 505-*a* may transmit, and wireless repeater 550 may receive, an indication of a transmission beam pattern based on the report of SSBs from the base station 505-*b* or base station 505-*a*. The transmission beam pattern may correspond to symbol periods during which the SSBs from base station 505-*a* or SSBs from the base station 505-*b* are transmitted. Accordingly, at 555, wireless repeater 550 may use the beam pattern to forward SSBs to UE 515. For example, wireless repeater 550 may transmit SSBs received from base station 505-*a* or base station 505-*b* based on the beam pattern indicated by base station 505-*a*, as described herein.

Figure 6:
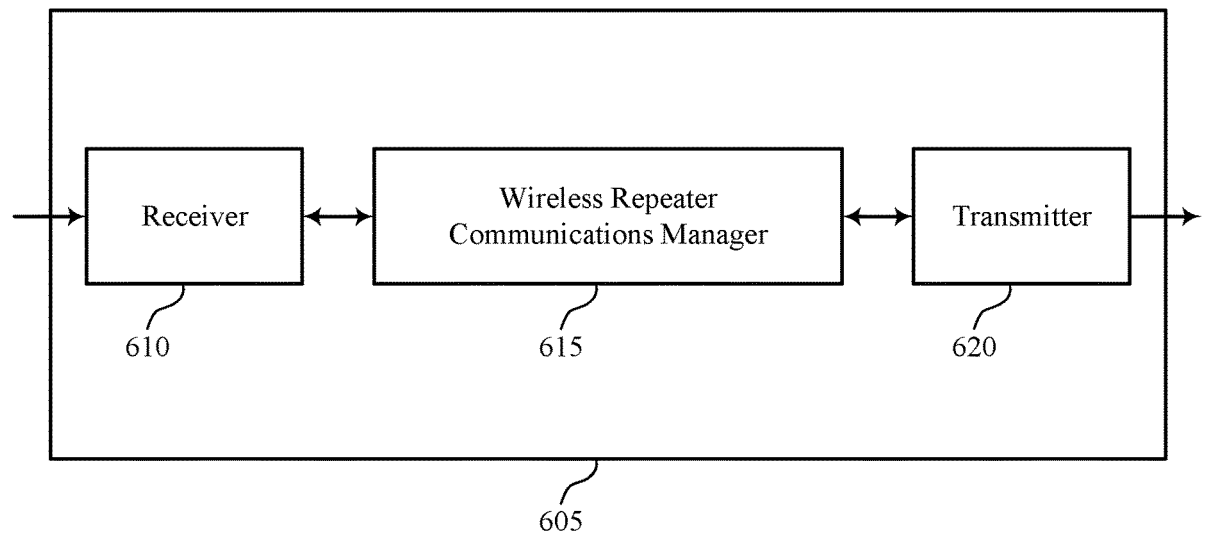
FIGS. 6 and 7 show block diagrams of devices that support techniques for connecting a wireless repeater to multiple base stations in accordance with various aspects of the present disclosure.

FIG. 6 shows a block diagram 600 of a device 605 that supports techniques for connecting a wireless repeater to multiple base stations in accordance with various aspects of the present disclosure. The device 605 may be an example of aspects of a wireless repeater (such as a wireless repeater 150 as shown in FIG. 1) as described herein. The device 605 may include a receiver 610, a wireless repeater communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for connecting a wireless repeater to multiple base stations, etc.). Information may be passed on to other components of the device 605. The receiver 610 may be an example of aspects of the transceiver 920 described with reference to FIG. 9. The receiver 610 may utilize a single antenna or a set of antennas.

The wireless repeater communications manager 615 may receive, from a first base station, instructions to monitor for SSBs from a second base station, transmit, to the first base station, a report indicating that one or more SSBs transmitted from the second base station were detected based on the instructions, and receive, from the first base station, an indication of a transmission beam pattern for one or more SSBs transmitted from the first base station, the one or more SSBs transmitted from the second base station, or a combination thereof, where the transmission beam pattern is based on the report. The wireless repeater communications manager 615 may be an example of aspects of the wireless repeater communications manager 910 described herein.

The wireless repeater communications manager 615, or its sub-components, may be implemented in hardware, code (e.g., software or firmware) executed by a processor, or any combination thereof. If implemented in code executed by a processor, the functions of the wireless repeater communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The wireless repeater communications manager 615, or its sub-components, may be physically located at various positions, including being distributed such that portions of functions are implemented at different physical locations by one or more physical components. In some examples, the wireless repeater communications manager 615, or its subcomponents, may be a separate and distinct component in accordance with various aspects of the present disclosure. In some examples, the wireless repeater communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the wireless repeater communications manager 615, as described herein, may be implemented to realize one or more potential advantages. For example, the wireless repeater communications manager 615 may receive instructions from a base station to search for signaling (including SSBs) transmitted by other base stations, and may report the search results to a base station (e.g., a controlling base station). This implementation may enable the wireless repeater to identify additional base stations that may provide one or more UEs with enhanced coverage in a wireless system. Additionally, the wireless repeater communications manager 615 may receive instructions from a base station indicating a beam pattern to use for receiving signaling transmitted from multiple base stations, which may enable the wireless repeater to coherently determine which beams to use for receiving SSBs during respective symbol periods. This implementation may advantageously reduce complexity at a wireless repeater through the configuration of beam patterns that enable the wireless repeater to efficiently detect and forward signals received from multiple base stations. By enabling the wireless repeater to connect to multiple base stations using the described techniques, communications quality and reliability may be increased for various UEs that communicate with different base stations via the wireless repeater.

The transmitter 620 may transmit signals generated by other components of the device 605. In some examples, the transmitter 620 may be collocated with a receiver 610 in a transceiver. For example, the transmitter 620 may be an example of aspects of the transceiver 920 described with reference to FIG. 9. The transmitter 620 may utilize a single antenna or a set of antennas.

Figure 7:
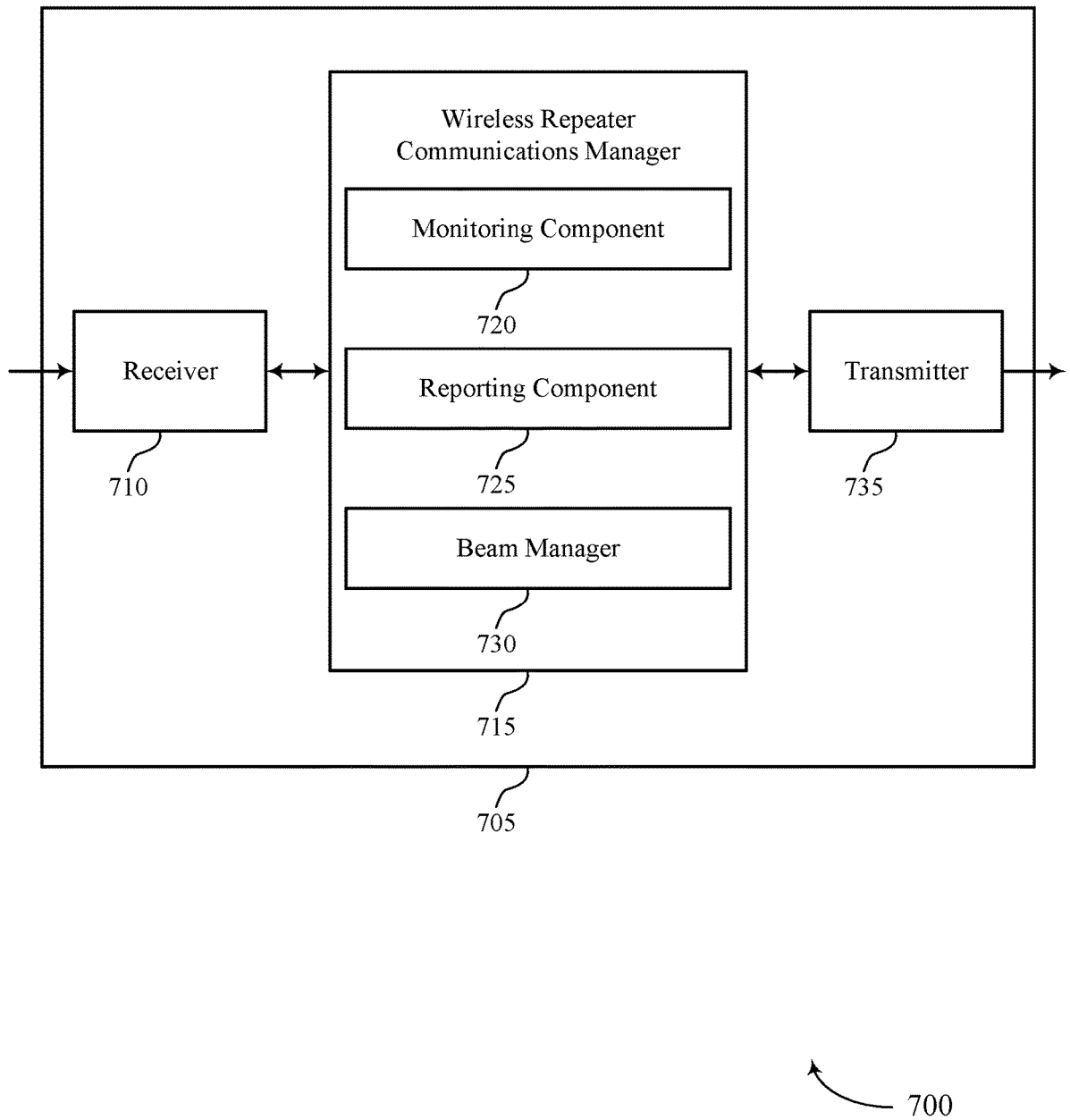

FIG. 7 shows a block diagram 700 of a device 705 that supports techniques for connecting a wireless repeater to multiple base stations in accordance with various aspects of the present disclosure. The device 705 may be an example of aspects of a device 605, or a wireless repeater 150 (as shown in FIG. 1) as described herein. The device 705 may include a receiver 710, a wireless repeater communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for connecting a wireless repeater to multiple base stations, etc.). Information may be passed on to other components of the device 705. The receiver 710 may be an example of aspects of the transceiver 920 described with reference to FIG. 9. The receiver 710 may utilize a single antenna or a set of antennas.

The wireless repeater communications manager 715 may be an example of aspects of the wireless repeater communications manager 615 as described herein. The wireless repeater communications manager 715 may include a monitoring component 720, a reporting component 725, and a beam manager 730. The wireless repeater communications manager 715 may be an example of aspects of the wireless repeater communications manager 910 described herein.

The monitoring component 720 may receive, from a first base station, instructions to monitor for SSBs from a second base station. The reporting component 725 may transmit, to the first base station, a report indicating that one or more SSBs transmitted from the second base station were detected based on the instructions.

The beam manager 730 may receive, from the first base station, an indication of a transmission beam pattern for one or more SSBs transmitted from the first base station, the one or more SSBs transmitted from the second base station, or a combination thereof, where the transmission beam pattern is based on the report.

The transmitter 735 may transmit signals generated by other components of the device 705. In some examples, the transmitter 735 may be collocated with a receiver 710 in a transceiver. For example, the transmitter 735 may be an example of aspects of the transceiver 920 described with reference to FIG. 9. The transmitter 735 may utilize a single antenna or a set of antennas.

Based on configuring at least one beam pattern for receiving signaling from one or more base stations, a processor of the wireless repeater (e.g., controlling the receiver 710, the transmitter 735, or the transceiver 920 as described with reference to FIG. 9) may efficiently determine that where and when signals are to be expected from the base stations. Further, the processor of the wireless repeater may identify additional base stations that the wireless repeater may connect to, which may be based on instructions to search for additional wireless devices transmitting signaling. The processor of the wireless repeater may turn on one or more processing units to monitor for signaling, configure a beam pattern (e.g., for reception beams), identify parameters or information associated with received signaling, or similar mechanisms within the wireless repeater. As such, when signaling from another wireless device is received at the wireless repeater, the processor may be ready to respond more efficiently through the reduction of a ramp up in processing power.

Figure 8:
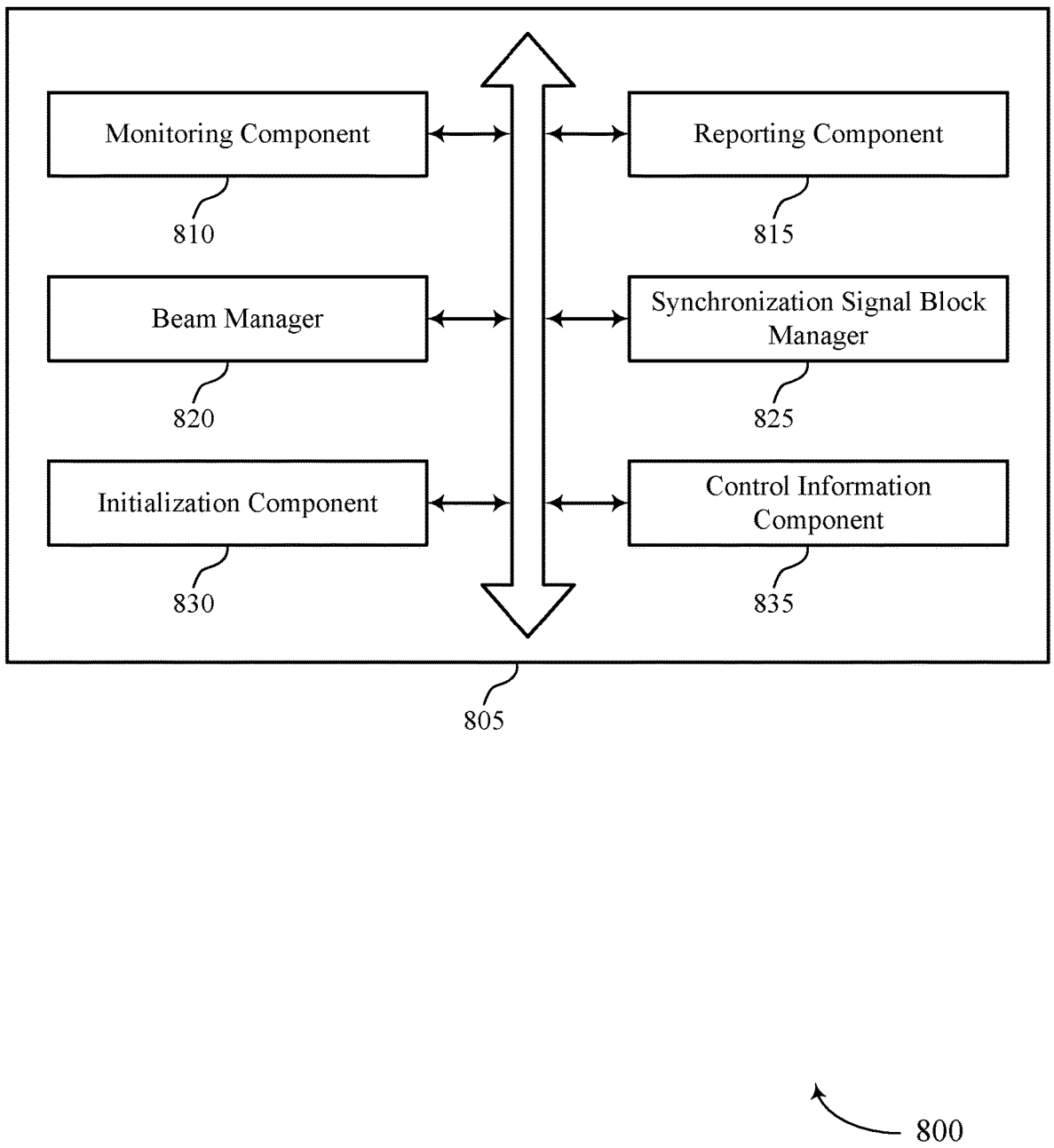
FIG. 8 shows a block diagram of a wireless repeater communications manager that supports techniques for connecting a wireless repeater to multiple base stations in accordance with various aspects of the present disclosure.

FIG. 8 shows a block diagram 800 of a wireless repeater communications manager 805 that supports techniques for connecting a wireless repeater to multiple base stations in accordance with various aspects of the present disclosure. The wireless repeater communications manager 805 may be an example of aspects of a wireless repeater communications manager 615, a wireless repeater communications manager 715, or a wireless repeater communications manager 910 described herein. The wireless repeater communications manager 805 may include a monitoring component 810, a reporting component 815, a beam manager 820, a synchronization signal block manager 825, an initialization component 830, and a control information component 835. Each of these components may communicate, directly or indirectly, with one another (e.g., via one or more buses).

The monitoring component 810 may receive, from a first base station, instructions to monitor for SSBs from a second base station. In some examples, the monitoring component 810 may monitor for the SSBs from the second base station during a monitoring interval based on the instructions. In some examples, the monitoring component 810 may receive, as part of the instructions, an indication to refrain from transmitting the one or more SSBs from the first base station during an interval of the set of periodic intervals that overlaps with the monitoring interval. In some examples, the monitoring component 810 may detect the one or more SSBs from the second base station based on the instructions. In some cases, the monitoring interval is non-overlapping with the set of periodic intervals.

The reporting component 815 may transmit, to the first base station, a report indicating that one or more SSBs transmitted from the second base station were detected based on the instructions. In some examples, the reporting component 815 may transmit, within the report, an indication of the set of properties associated with the one or more SSBs from the second base station.

In some examples, the reporting component 815 may transmit, within the report, an indication of the one or more additional SSBs from the first base station. In some examples, the reporting component 815 may transmit the report in a portion of a bandwidth used to receive the one or more SSBs from the first base station. In some examples, the reporting component 815 may transmit the report in a first bandwidth that is different from a second bandwidth used to receive the one or more SSBs from the first base station. In some examples, the reporting component 815 may transmit, within the report, an indication of a first reception beam, a second reception beam, a first set of one or more symbol periods, a second set of one or more symbol periods, or a combination thereof.

The beam manager 820 may receive, from the first base station, an indication of a transmission beam pattern for one or more SSBs transmitted from the first base station, the one or more SSBs transmitted from the second base station, or a combination thereof, where the transmission beam pattern is based on the report. In some cases, the transmission beam pattern corresponds to symbol periods during which the one or more SSBs from the first base station are transmitted, the one or more SSBs from the second base station are transmitted, or a combination thereof.

In some examples, the beam manager 820 may identify a first reception beam used to receive the one or more SSBs transmitted from the first base station during a first set of one or more symbol periods. In some cases, the beam manager 820 may identify a second reception beam used to receive the one or more SSBs transmitted from the second base station during a second set of one or more symbol periods. In some cases, the transmission beam pattern may be based on the indication of the first reception beam, the second reception beam, the first set of one or more symbol periods, the second set of one or more symbol periods, or a combination thereof. In some cases, the beam manager 820 may configure reception beams for receiving, during a set of one or more symbol periods, the one or more SSBs transmitted from the first base station, the one or more SSBs transmitted from the second base station during a second set of one or more symbol periods, or a combination thereof, wherein the configuration is based at least in part on the indication of the transmission beam pattern.

The synchronization signal block manager 825 may receive the one or more SSBs from the first base station. In some examples, the synchronization signal block manager 825 may transmit, to one or more wireless devices, the one or more SSBs from the first base station, the one or more SSBs being transmitted during a set of periodic intervals. In some examples, the synchronization signal block manager 825 may determine, based on detecting the one or more SSBs from the second base station, a set of properties associated with the one or more SSBs from the second base station.

In some examples, the synchronization signal block manager 825 may detect one or more additional SSBs from the first base station based on the instructions. In some cases, the set of properties includes a reference signal received power of the one or more SSBs from the second base station, an identity of the second base station, a time offset for signals received from the second base station, or a combination thereof.

The initialization component 830 may perform an initialization procedure to connect with the second base station based on the detected the one or more SSBs from the second base station. The control information component 835 may receive, from the first base station, control information including the instructions, where the control information is received in a portion of a bandwidth used to receive the one or more SSBs from the first base station.

In some examples, the control information component 835 may receive, from the first base station, control information including the instructions, where the control information is received in a first bandwidth that is different from a second bandwidth used to receive the one or more SSBs from the first base station.

Figure 9:
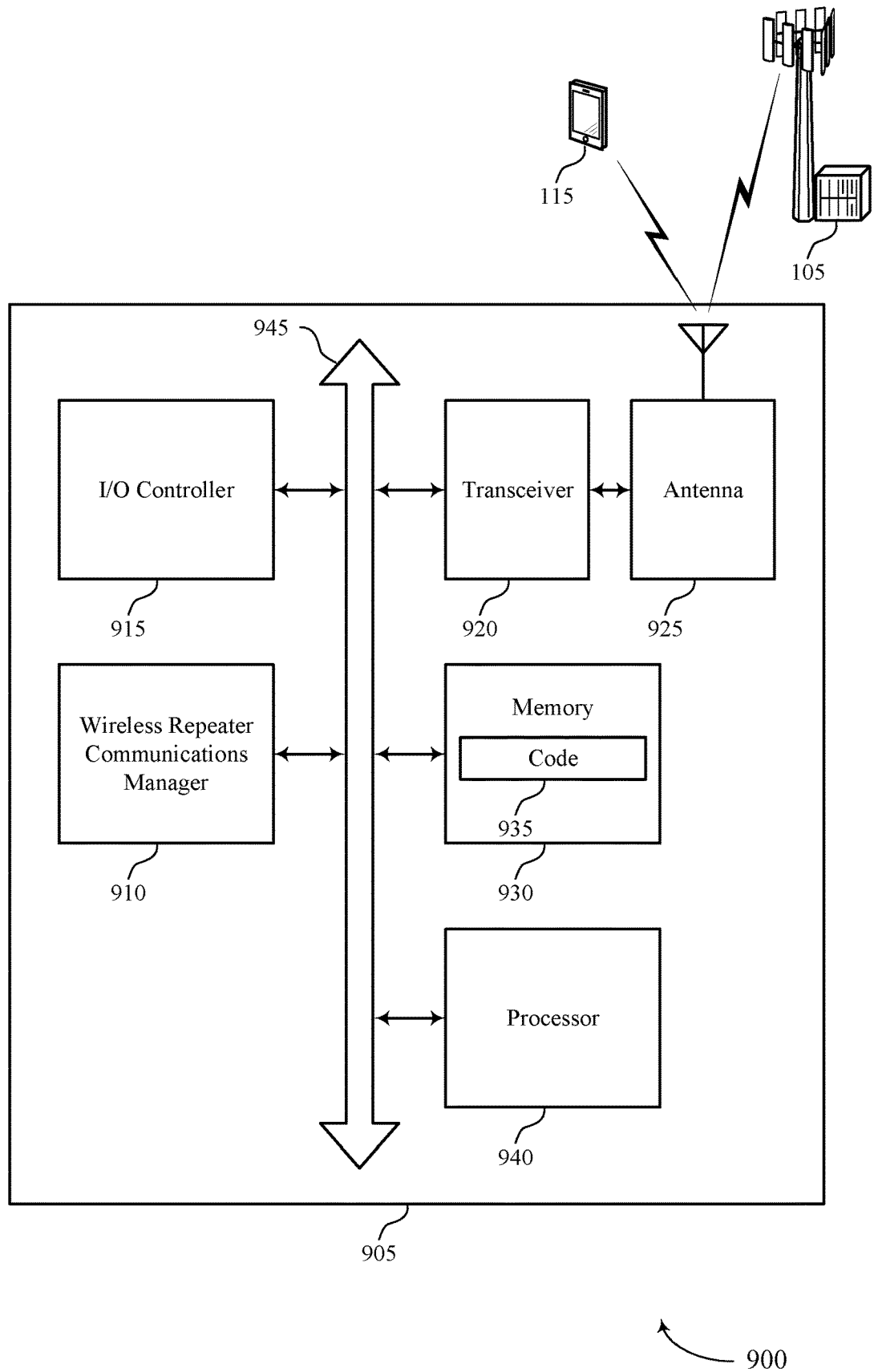
FIG. 9 shows a diagram of a system including a device that supports techniques for connecting a wireless repeater to multiple base stations in accordance with various aspects of the present disclosure.

FIG. 9 shows a diagram of a system 900 including a device 905 that supports techniques for connecting a wireless repeater to multiple base stations in accordance with various aspects of the present disclosure. The device 905 may be an example of or include the components of device 605, device 705, or wireless repeater 150 (as shown in FIG. 1) as described herein. The device 905 may include components for bi-directional voice and data communications including components for transmitting and receiving communications, including a wireless repeater communications manager 910, an I/O controller 915, a transceiver 920, an antenna 925, memory 930, and a processor 940. These components may be in electronic communication via one or more buses (e.g., bus 945).

The wireless repeater communications manager 910 may receive, from a first base station, instructions to monitor for SSBs from a second base station, transmit, to the first base station, a report indicating that one or more SSBs transmitted from the second base station were detected based on the instructions, and receive, from the first base station, an indication of a transmission beam pattern for one or more SSBs transmitted from the first base station, the one or more SSBs transmitted from the second base station, or a combination thereof, where the transmission beam pattern is based on the report.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for connecting a wireless repeater to multiple base stations).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
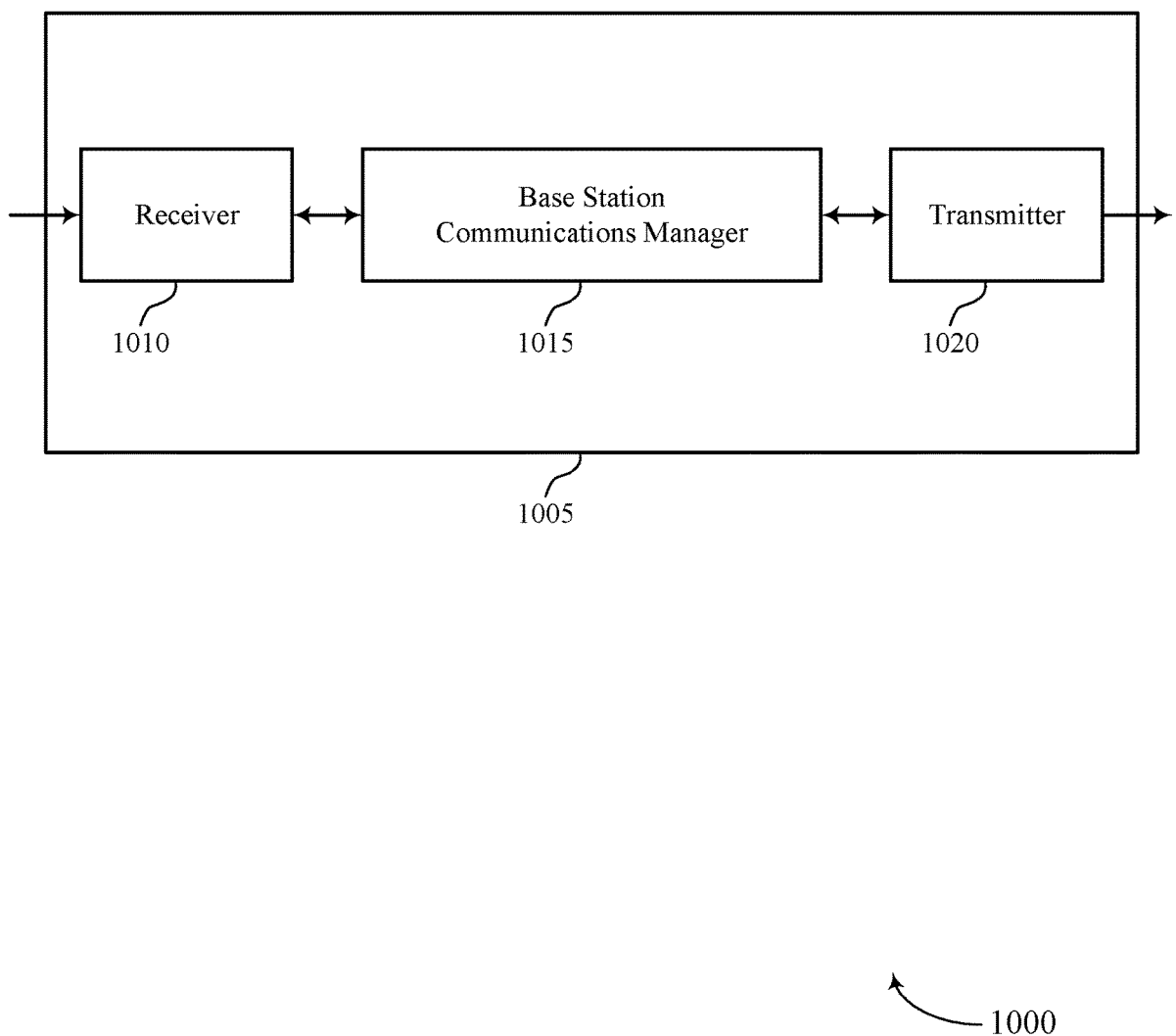
FIGS. 10 and 11 show block diagrams of devices that support techniques for connecting a wireless repeater to multiple base stations in accordance with various aspects of the present disclosure.

FIG. 10 shows a block diagram 1000 of a device 1005 that supports techniques for connecting a wireless repeater to multiple base stations in accordance with various aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for connecting a wireless repeater to multiple base stations, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit, to a wireless repeater, instructions to monitor for SSBs from a second base station, receive, from the wireless repeater, a report indicating that one or more SSBs transmitted from the second base station were detected based on the instructions, and transmit, to the wireless repeater, an indication of a transmission beam pattern for one or more SSBs transmitted from the first base station, the one or more SSBs transmitted from the second base station, or a combination thereof, where the transmission beam pattern is based on the report. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its subcomponents, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver. For example, the transmitter 1020 may be an example of aspects of the transceiver 1320 described with reference to FIG. 13. The transmitter 1020 may utilize a single antenna or a set of antennas.

Figure 11:
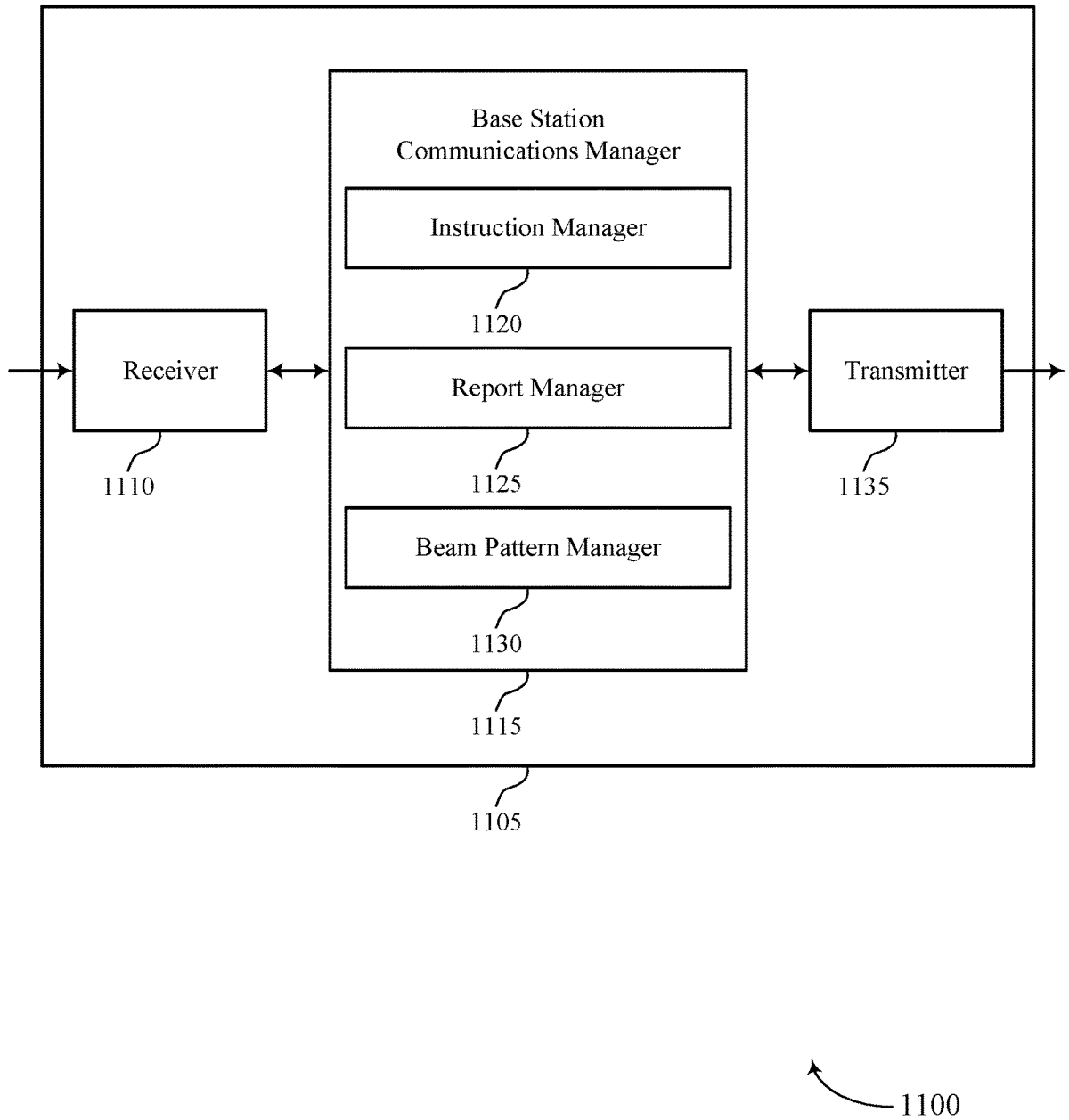

FIG. 11 shows a block diagram 1100 of a device 1105 that supports techniques for connecting a wireless repeater to multiple base stations in accordance with various aspects of the present disclosure. The device 1105 may be an example of aspects of a device 1005, or a base station 105 as described herein. The device 1105 may include a receiver 1110, a base station communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for connecting a wireless repeater to multiple base stations, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include an instruction manager 1120, a report manager 1125, and a beam pattern manager 1130. The base station communications manager 1115 may be an example of aspects of the base station communications manager 1310 described herein.

The instruction manager 1120 may transmit, to a wireless repeater, instructions to monitor for SSBs from a second base station. The report manager 1125 may receive, from the wireless repeater, a report indicating that one or more SSBs transmitted from the second base station were detected based on the instructions.

The beam pattern manager 1130 may transmit, to the wireless repeater, an indication of a transmission beam pattern for one or more SSBs transmitted from the first base station, the one or more SSBs transmitted from the second base station, or a combination thereof, where the transmission beam pattern is based on the report.

The transmitter 1135 may transmit signals generated by other components of the device 1105. In some examples, the transmitter 1135 may be collocated with a receiver 1110 in a transceiver. For example, the transmitter 1135 may be an example of aspects of the transceiver 1320 described with reference to FIG. 13. The transmitter 1135 may utilize a single antenna or a set of antennas.

Figure 12:
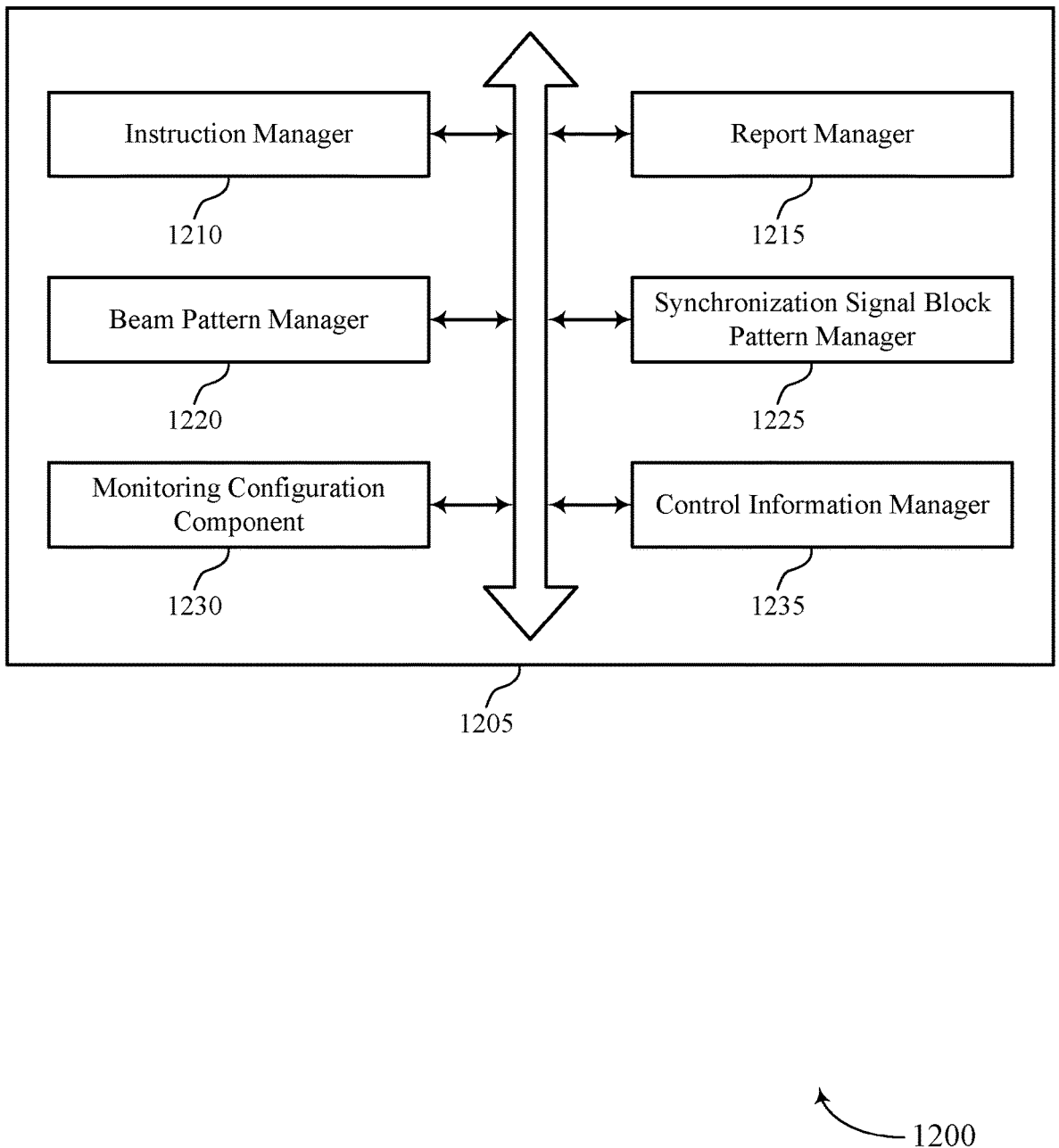
FIG. 12 shows a block diagram of a base station communications manager that supports techniques for connecting a wireless repeater to multiple base stations in accordance with various aspects of the present disclosure.

FIG. 12 shows a block diagram 1200 of a base station communications manager 1205 that supports techniques for connecting a wireless repeater to multiple base stations in accordance with various aspects of the present disclosure. The base station communications manager 1205 may be an example of aspects of a base station communications manager 1015, a base station communications manager 1115, or a base station communications manager 1310 described herein. The base station communications manager 1205 may include an instruction manager 1210, a report manager 1215, a beam pattern manager 1220, a synchronization signal block pattern manager 1225, a monitoring configuration component 1230, and a control information manager 1235. Each of these components may communicate, directly or indirectly, with one another (e.g., via one or more buses).

The instruction manager 1210 may transmit, to a wireless repeater, instructions to monitor for SSBs from a second base station. In some examples, the instruction manager 1210 may transmit, within the instructions, an indication of the monitoring interval. In some examples, the instruction manager 1210 may transmit, as part of the instructions, an indication to refrain from transmitting the one or more SSBs from the first base station during the interval based on the identified collision.

The report manager 1215 may receive, from the wireless repeater, a report indicating that one or more SSBs transmitted from the second base station were detected based on the instructions. In some examples, the report manager 1215 may receive, within the report, an indication of a set of properties associated with the one or more SSBs from the second base station. In some examples, the report manager 1215 may receive, within the report, an indication of a first reception beam and a first set of one or more symbol periods for receiving (e.g., by the wireless repeater) the one or more SSBs transmitted from the first base station and an indication of a second reception beam and a second set of one or more symbol periods for receiving (e.g., by the wireless repeater) the one or more SSBs transmitted from the second base station.

In some examples, the report manager 1215 may receive the report in a portion of a bandwidth used to transmit the one or more SSBs to the wireless repeater. In some examples, the report manager 1215 may receive the report in a first bandwidth that is different from a second bandwidth used to transmit the one or more SSBs to the wireless repeater. In some cases, the set of properties includes a reference signal received power of the one or more SSBs from the second base station, an identity of the second base station, a time offset for signals received from the second base station, or a combination thereof.

The beam pattern manager 1220 may transmit, to the wireless repeater, an indication of a transmission beam pattern for one or more SSBs transmitted from the first base station, the one or more SSBs transmitted from the second base station, or a combination thereof, where the transmission beam pattern is based on the report. In some cases, the transmission beam pattern corresponds to symbol periods during which the one or more SSBs from the first base station are transmitted, the one or more SSBs from the second base station are transmitted, or a combination thereof. In some examples, the beam pattern manager 1220 may determine the transmission beam pattern based on the indication of the first reception beam, the second reception beam, the first set of one or more symbol periods, the second set of one or more symbol periods, or a combination thereof.

The synchronization signal block pattern manager 1225 may determine, based on the report, a synchronization signal block pattern for the one or more SSBs transmitted from the first base station, the one or more SSBs transmitted from the second base station, or a combination thereof, where the transmission beam pattern corresponds to the synchronization signal block pattern. In some examples, the synchronization signal block pattern manager 1225 may communicate with the second base station to configure the synchronization signal block pattern based on the report.

The monitoring configuration component 1230 may configure a monitoring interval to monitor for the SSBs from the second base station. In some examples, the monitoring configuration component 1230 may determine a set of periodic intervals the wireless repeater uses for transmitting the one or more SSBs from the first base station. In some examples, the monitoring configuration component 1230 may identify a collision between an interval of the set of periodic intervals and the monitoring interval. In some examples, the monitoring configuration component 1230 may determine a set of periodic intervals the wireless repeater uses for transmitting the one or more SSBs from the first base station, where the monitoring interval is non-overlapping with the set of periodic intervals.

The control information manager 1235 may transmit control information including the instructions, where the control information is transmitted in a portion of a bandwidth used to transmit the one or more SSBs to the wireless repeater. In some examples, the control information manager 1235 may transmit control information including the instructions in a first bandwidth that is different from a second bandwidth used to transmit the one or more SSBs to the wireless repeater.

Figure 13:
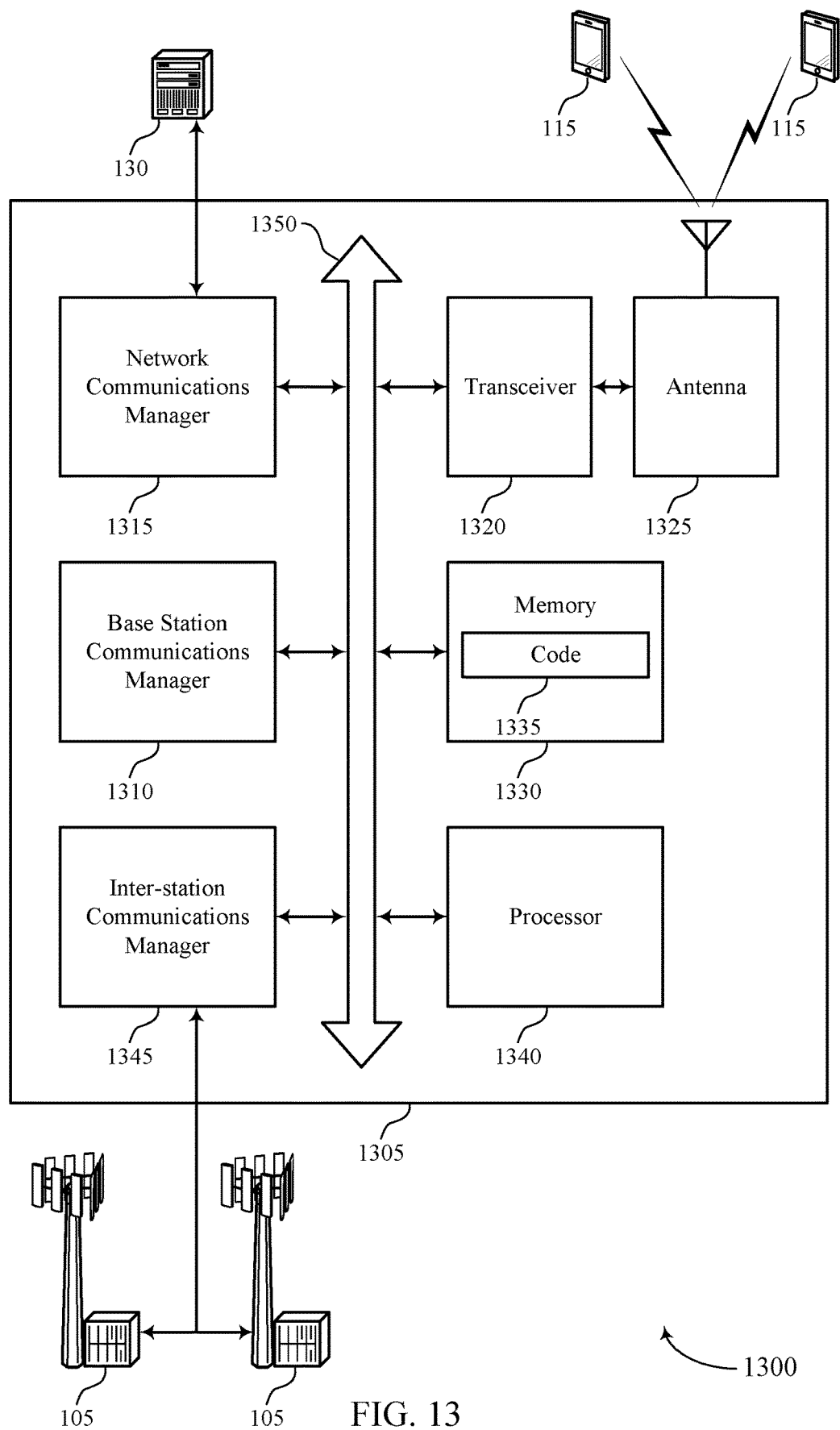
FIG. 13 shows a diagram of a system including a device that supports techniques for connecting a wireless repeater to multiple base stations in accordance with various aspects of the present disclosure.

FIG. 13 shows a diagram of a system 1300 including a device 1305 that supports techniques for connecting a wireless repeater to multiple base stations in accordance with various aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit, to a wireless repeater, instructions to monitor for SSBs from a second base station, receive, from the wireless repeater, a report indicating that one or more SSBs transmitted from the second base station were detected based on the instructions, and transmit, to the wireless repeater, an indication of a transmission beam pattern for one or more SSBs transmitted from the first base station, the one or more SSBs transmitted from the second base station, or a combination thereof, where the transmission beam pattern is based on the report.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for connecting a wireless repeater to multiple base stations).

The inter-station communications manager 1345 may manage communications with another base station 105, and may include a controller or scheduler for controlling communications with UEs 115 in cooperation with the other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
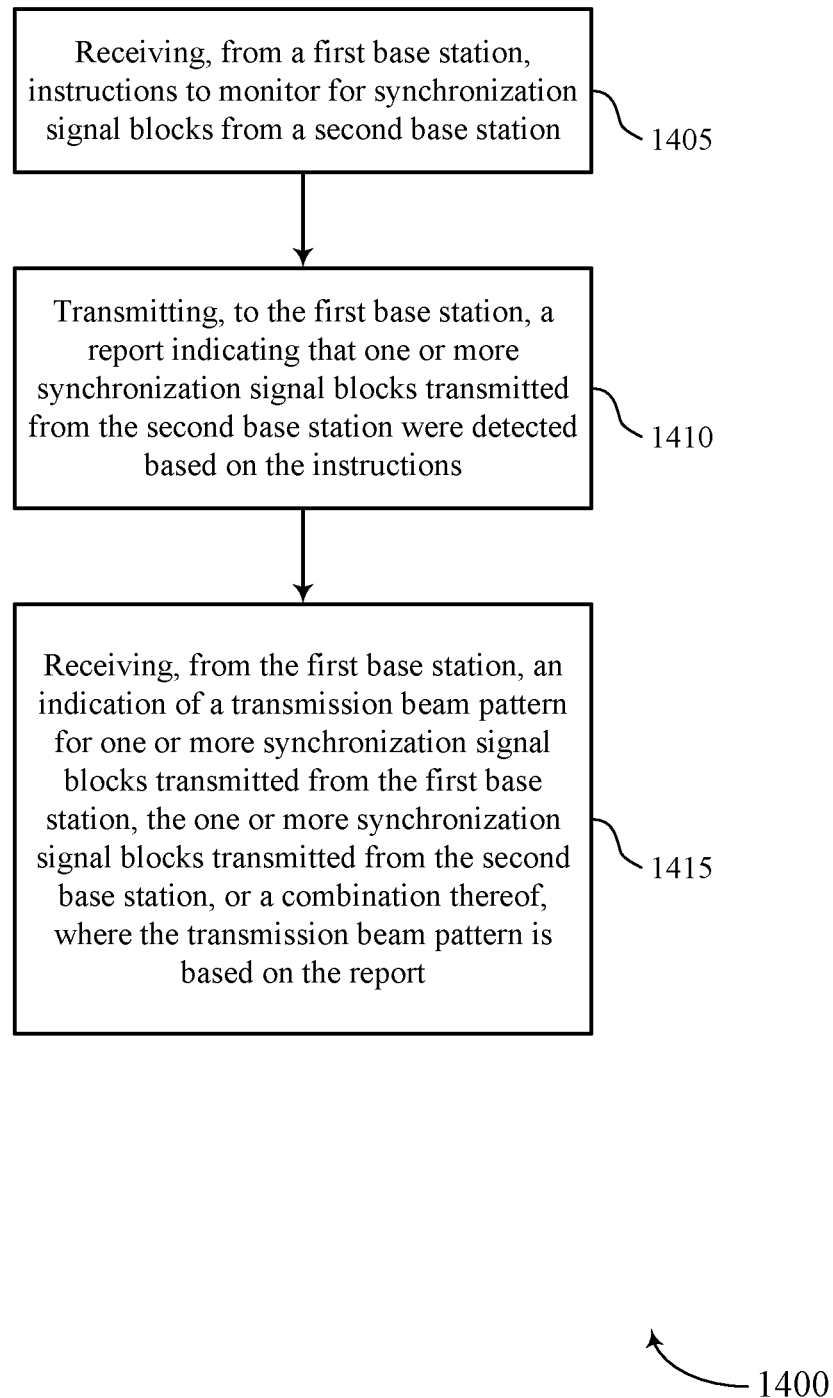
FIGS. 14 through 18 show flowcharts illustrating methods that support techniques for connecting a wireless repeater to multiple base stations in accordance with various aspects of the present disclosure.

FIG. 14 shows a flowchart illustrating a method 1400 that supports techniques for connecting a wireless repeater to multiple base stations in accordance with various aspects of the present disclosure. The operations of method 1400 may be implemented by a wireless repeater (such as a wireless repeater 150 as shown in FIG. 1) or its components as described herein. For example, the operations of method 1400 may be performed by a wireless repeater communications manager as described with reference to FIGS. 6 through 9. In some examples, a wireless repeater may execute a set of instructions to control the functional elements of the wireless repeater to perform the functions described herein. Additionally or alternatively, a wireless repeater may perform aspects of the functions described herein using special-purpose hardware.

At 1405, the wireless repeater may receive, from a first base station, instructions to monitor for SSBs from a second base station. The operations of 1405 may be performed according to the methods described herein. In some examples, aspects of the operations of 1405 may be performed by a monitoring component as described with reference to FIGS. 6 through 9.

At 1410, the wireless repeater may transmit, to the first base station, a report indicating that one or more SSBs transmitted from the second base station were detected based on the instructions. The operations of 1410 may be performed according to the methods described herein. In some examples, aspects of the operations of 1410 may be performed by a reporting component as described with reference to FIGS. 6 through 9.

At 1415, the wireless repeater may receive, from the first base station, an indication of a transmission beam pattern for one or more SSBs transmitted from the first base station, the one or more SSBs transmitted from the second base station, or a combination thereof, where the transmission beam pattern is based on the report. The operations of 1415 may be performed according to the methods described herein. In some examples, aspects of the operations of 1415 may be performed by a beam manager as described with reference to FIGS. 6 through 9.

Figure 15:
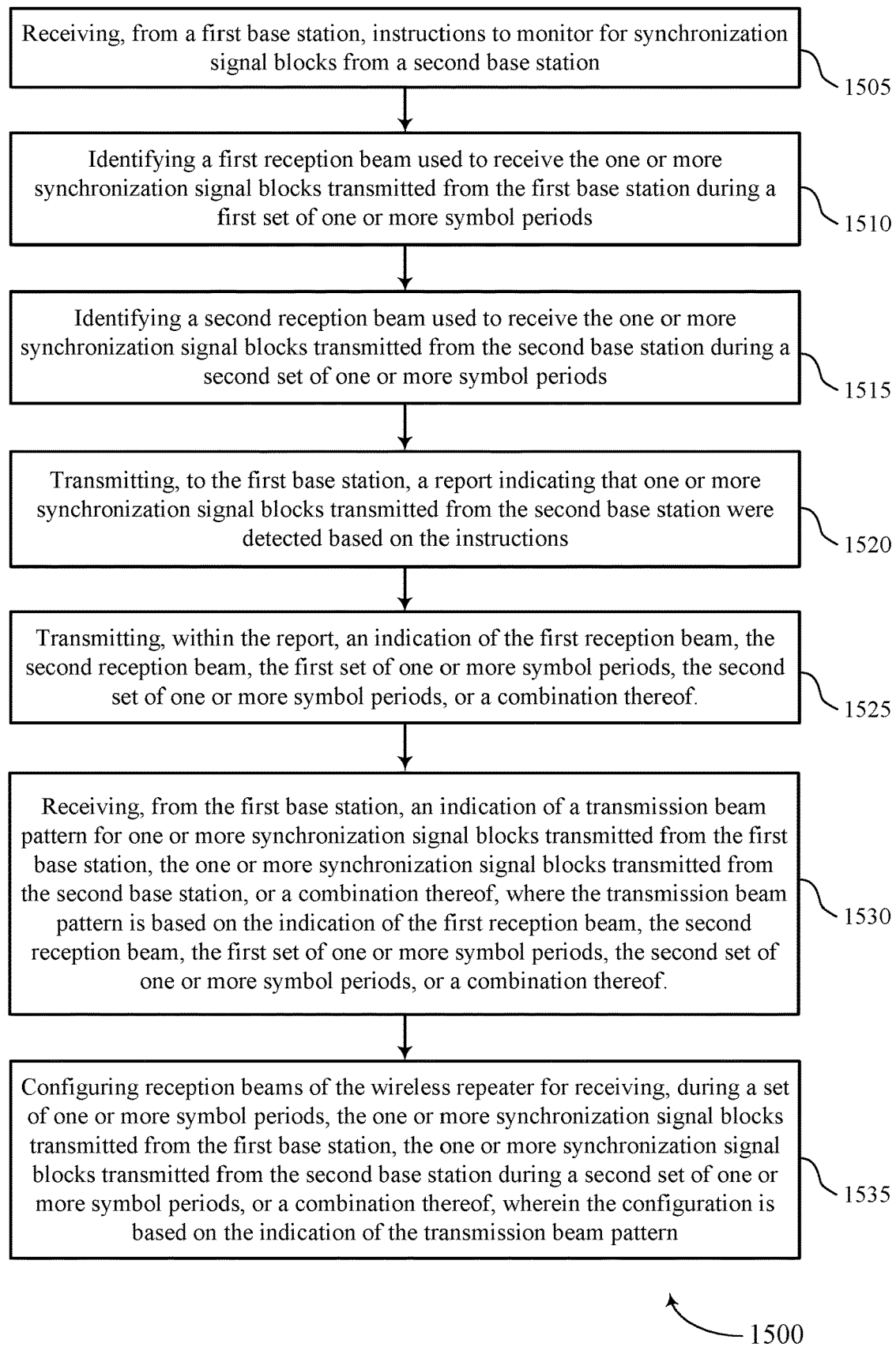

FIG. 15 shows a flowchart illustrating a method 1500 that supports techniques for connecting a wireless repeater to multiple base stations in accordance with various aspects of the present disclosure. The operations of method 1500 may be implemented by a wireless repeater (such as a wireless repeater 150 as shown in FIG. 1) or its components as described herein. For example, the operations of method 1500 may be performed by a wireless repeater communications manager as described with reference to FIGS. 6 through 9. In some examples, a wireless repeater may execute a set of instructions to control the functional elements of the wireless repeater to perform the functions described herein. Additionally or alternatively, a wireless repeater may perform aspects of the functions described herein using special-purpose hardware.

At 1505, the wireless repeater may receive, from a first base station, instructions to monitor for SSBs from a second base station. The operations of 1505 may be performed according to the methods described herein. In some examples, aspects of the operations of 1505 may be performed by a monitoring component as described with reference to FIGS. 6 through 9.

At 1510, the wireless repeater may identify a first reception beam used to receive the one or more SSBs transmitted from the first base station during a first set of one or more symbol periods. The operations of 1510 may be performed according to the methods described herein. In some examples, aspects of the operations of 1510 may be performed by a beam manager as described with reference to FIGS. 6 through 9.

At 1515, the wireless repeater may identify a second reception beam used to receive the one or more SSBs transmitted from the second base station during a second set of one or more symbol periods. The operations of 1515 may be performed according to the methods described herein. In some examples, aspects of the operations of 1515 may be performed by a beam manager as described with reference to FIGS. 6 through 9.

At 1520, the wireless repeater may transmit, to the first base station, a report indicating that one or more SSBs transmitted from the second base station were detected based on the instructions. The operations of 1520 may be performed according to the methods described herein. In some examples, aspects of the operations of 1520 may be performed by a reporting component as described with reference to FIGS. 6 through 9.

At 1525, the wireless repeater may transmit, within the report, an indication of the first reception beam, the second reception beam, the first set of one or more symbol periods, the second set of one or more symbol periods, or a combination thereof. The operations of 1525 may be performed according to the methods described herein. In some examples, aspects of the operations of 1525 may be performed by a reporting component as described with reference to FIGS. 6 through 9.

At 1530, the wireless repeater may receive, from the first base station, an indication of a transmission beam pattern for one or more SSBs transmitted from the first base station, the one or more SSBs transmitted from the second base station, or a combination thereof, where the transmission beam pattern is based on the report. The operations of 1530 may be performed according to the methods described herein. In some examples, aspects of the operations of 1530 may be performed by a beam manager as described with reference to FIGS. 6 through 9.

At 1535, the wireless repeater may configure reception beams of the wireless repeater for receiving, during a set of one or more symbol periods, the one or more SSBs transmitted from the first base station, the one or more SSBs transmitted from the second base station during a second set of one or more symbol periods, or a combination thereof, wherein the configuration is based on the indication of the transmission beam pattern. The operations of 1535 may be performed according to the methods described herein. In some examples, aspects of the operations of 1535 may be performed by a beam manager as described with reference to FIGS. 6 through 9.

Figure 16:
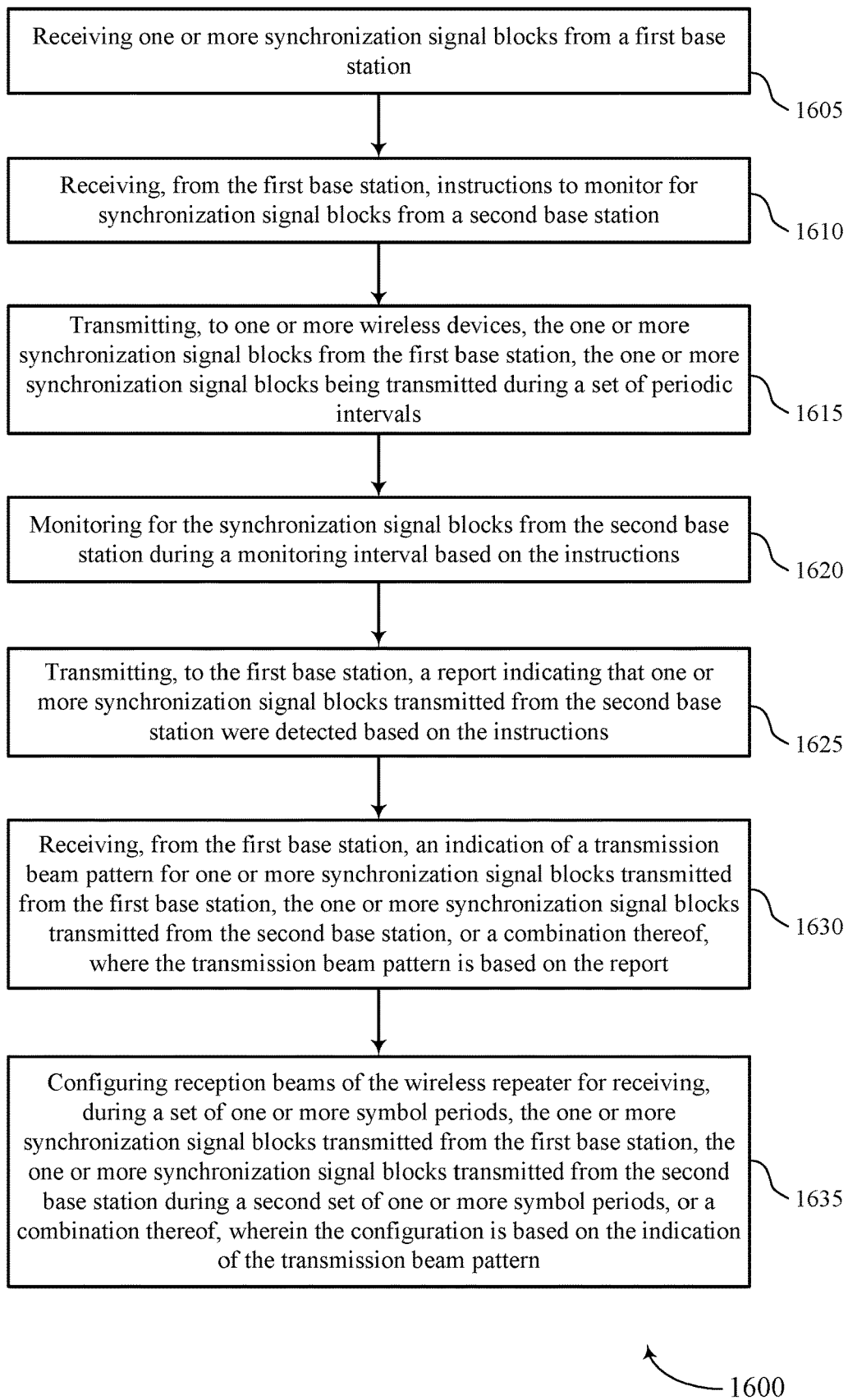

FIG. 16 shows a flowchart illustrating a method 1600 that supports techniques for connecting a wireless repeater to multiple base stations in accordance with various aspects of the present disclosure. The operations of method 1600 may be implemented by a wireless repeater or its components as described herein. For example, the operations of method 1600 may be performed by a wireless repeater communications manager as described with reference to FIGS. 6 through 9. In some examples, a wireless repeater may execute a set of instructions to control the functional elements of the wireless repeater to perform the functions described herein. Additionally or alternatively, a wireless repeater may perform aspects of the functions described herein using special-purpose hardware.

At 1605, the wireless repeater may receive the one or more SSBs from the first base station. The operations of 1605 may be performed according to the methods described herein. In some examples, aspects of the operations of 1605 may be performed by a synchronization signal block manager as described with reference to FIGS. 6 through 9.

At 1610, the wireless repeater may receive, from a first base station, instructions to monitor for SSBs from a second base station. The operations of 1610 may be performed according to the methods described herein. In some examples, aspects of the operations of 1610 may be performed by a monitoring component as described with reference to FIGS. 6 through 9.

At 1615, the wireless repeater may transmit, to one or more wireless devices, the one or more SSBs from the first base station, the one or more SSBs being transmitted during a set of periodic intervals. The operations of 1615 may be performed according to the methods described herein. In some examples, aspects of the operations of 1615 may be performed by a synchronization signal block manager as described with reference to FIGS. 6 through 9.

At 1620, the wireless repeater may monitor for the SSBs from the second base station during a monitoring interval based on the instructions. The operations of 1620 may be performed according to the methods described herein. In some examples, aspects of the operations of 1620 may be performed by a monitoring component as described with reference to FIGS. 6 through 9.

At 1625, the wireless repeater may transmit, to the first base station, a report indicating that one or more SSBs transmitted from the second base station were detected based on the instructions. The operations of 1625 may be performed according to the methods described herein. In some examples, aspects of the operations of 1625 may be performed by a reporting component as described with reference to FIGS. 6 through 9.

At 1630, the wireless repeater may receive, from the first base station, an indication of a transmission beam pattern for one or more SSBs transmitted from the first base station, the one or more SSBs transmitted from the second base station, or a combination thereof, where the transmission beam pattern is based on the report. The operations of 1630 may be performed according to the methods described herein. In some examples, aspects of the operations of 1630 may be performed by a beam manager as described with reference to FIGS. 6 through 9.

At 1635, the wireless repeater may configure reception beams of the wireless repeater for receiving, during a set of one or more symbol periods, the one or more SSBs transmitted from the first base station, the one or more SSBs transmitted from the second base station during a second set of one or more symbol periods, or a combination thereof, wherein the configuration is based on the indication of the transmission beam pattern. The operations of 1635 may be performed according to the methods described herein. In some examples, aspects of the operations of 1635 may be performed by a beam manager as described with reference to FIGS. 6 through 9.

Figure 17:
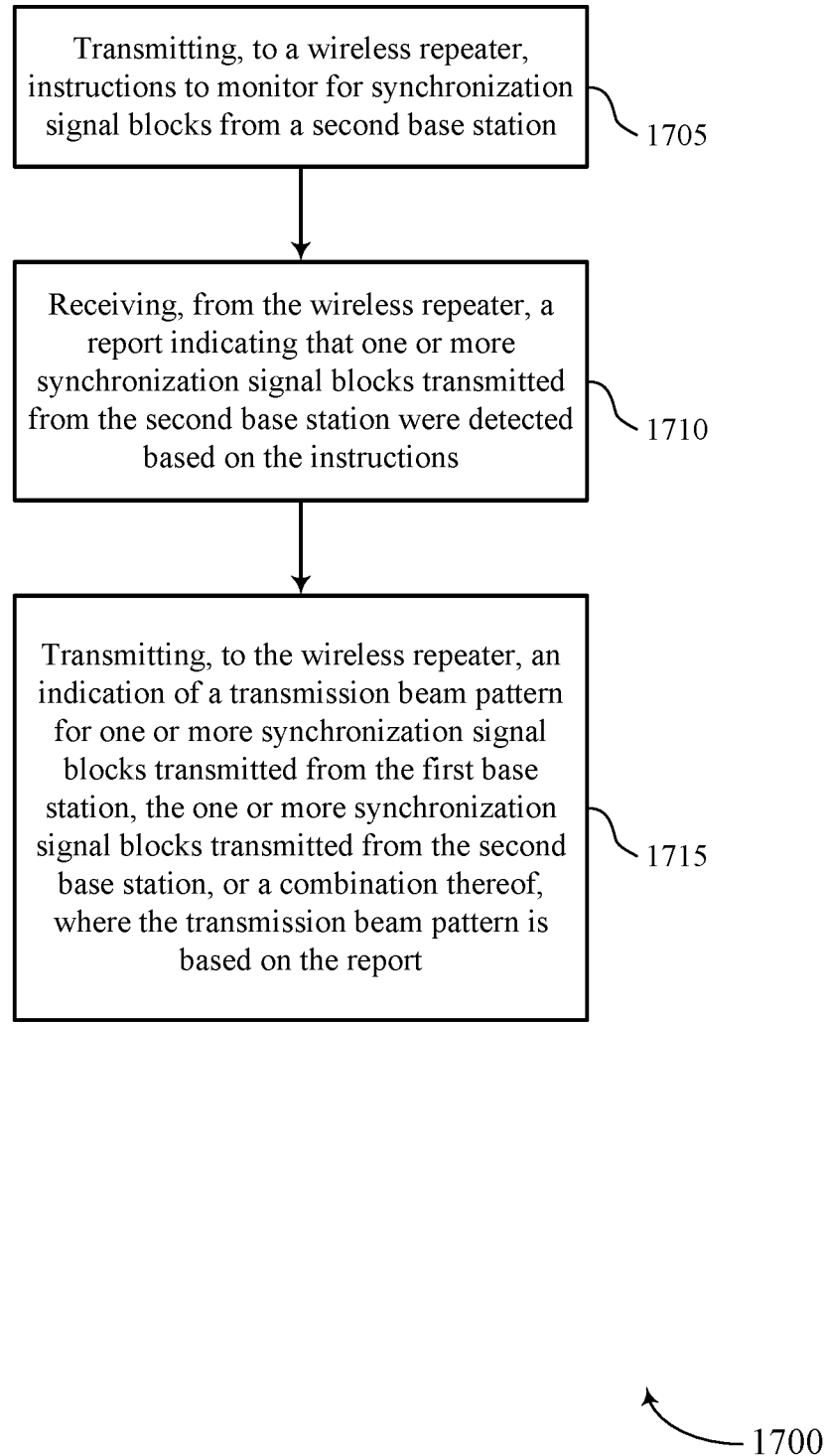

FIG. 17 shows a flowchart illustrating a method 1700 that supports techniques for connecting a wireless repeater to multiple base stations in accordance with various aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a wireless repeater, instructions to monitor for SSBs from a second base station. The operations of 1705 may be performed according to the methods described herein. In some examples, aspects of the operations of 1705 may be performed by an instruction manager as described with reference to FIGS. 10 through 13.

At 1710, the base station may receive, from the wireless repeater, a report indicating that one or more SSBs transmitted from the second base station were detected based on the instructions. The operations of 1710 may be performed according to the methods described herein. In some examples, aspects of the operations of 1710 may be performed by a report manager as described with reference to FIGS. 10 through 13.

At 1715, the base station may transmit, to the wireless repeater, an indication of a transmission beam pattern for one or more SSBs transmitted from the first base station, the one or more SSBs transmitted from the second base station, or a combination thereof, where the transmission beam pattern is based on the report. The operations of 1715 may be performed according to the methods described herein. In some examples, aspects of the operations of 1715 may be performed by a beam pattern manager as described with reference to FIGS. 10 through 13.

Figure 18:
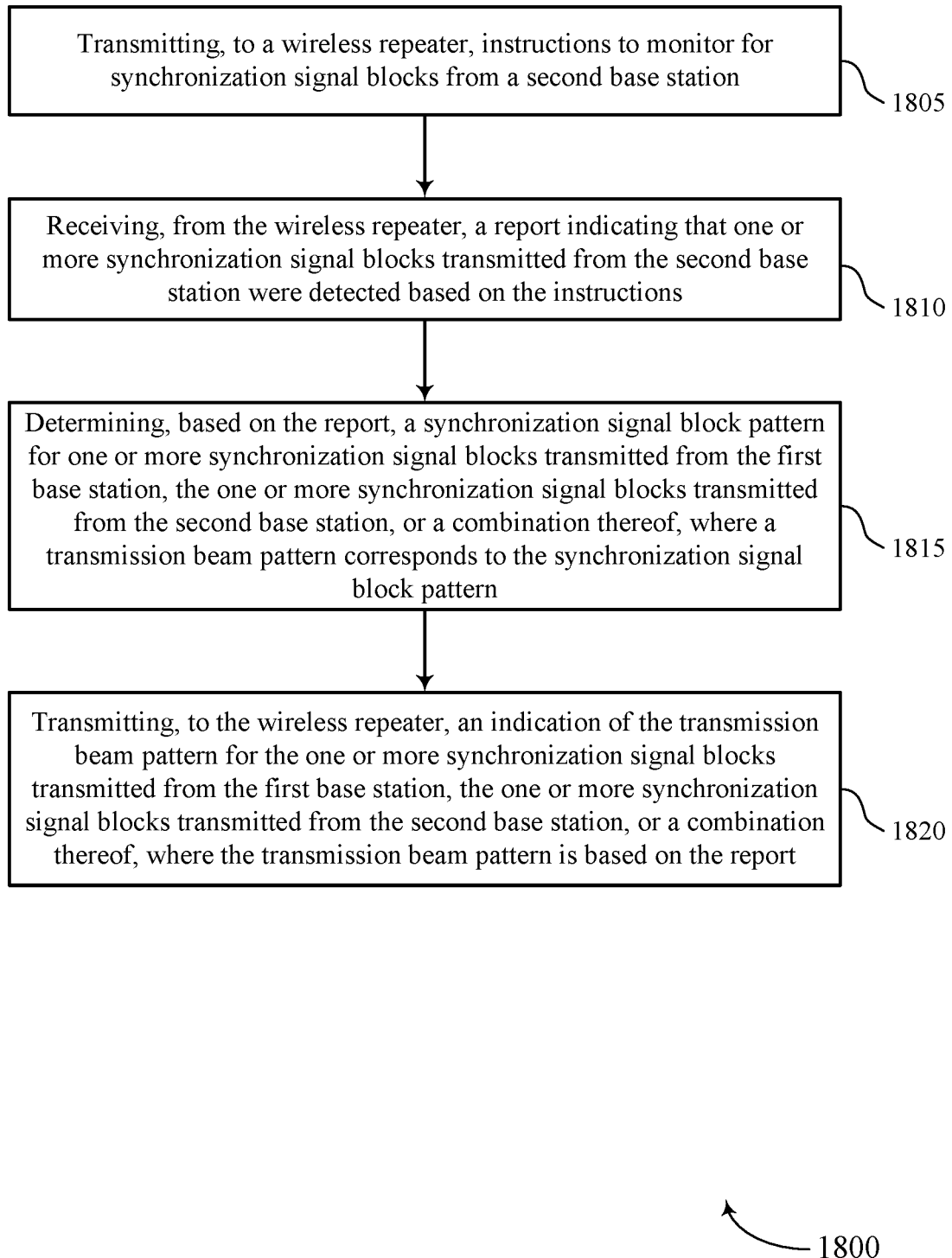

FIG. 18 shows a flowchart illustrating a method 1800 that supports techniques for connecting a wireless repeater to multiple base stations in accordance with various aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a wireless repeater, instructions to monitor for SSBs from a second base station. The operations of 1805 may be performed according to the methods described herein. In some examples, aspects of the operations of 1805 may be performed by an instruction manager as described with reference to FIGS. 10 through 13.

At 1810, the base station may receive, from the wireless repeater, a report indicating that one or more SSBs transmitted from the second base station were detected based on the instructions. The operations of 1810 may be performed according to the methods described herein. In some examples, aspects of the operations of 1810 may be performed by a report manager as described with reference to FIGS. 10 through 13.

At 1815, the base station may determine, based on the report, a synchronization signal block pattern for the one or more SSBs transmitted from the first base station, the one or more SSBs transmitted from the second base station, or a combination thereof, where the transmission beam pattern corresponds to the synchronization signal block pattern. The operations of 1815 may be performed according to the methods described herein. In some examples, aspects of the operations of 1815 may be performed by a synchronization signal block pattern manager as described with reference to FIGS. 10 through 13.

At 1820, the base station may transmit, to the wireless repeater, an indication of a transmission beam pattern for one or more SSBs transmitted from the first base station, the one or more SSBs transmitted from the second base station, or a combination thereof, where the transmission beam pattern is based on the report. The operations of 1820 may be performed according to the methods described herein. In some examples, aspects of the operations of 1820 may be performed by a beam pattern manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless repeater, comprising:
    receiving, from a first network entity, instructions to monitor for synchronization signal blocks from a second network entity;
    transmitting, to the first network entity, a report indicating that one or more synchronization signal blocks transmitted from the second network entity were detected based at least in part on the instructions; and
    receiving, from the first network entity, an indication of a transmission beam pattern for one or more synchronization signal blocks transmitted from the first network entity, the one or more synchronization signal blocks transmitted from the second network entity, or any combination thereof, wherein the transmission beam pattern is configured for forwarding the one or more synchronization signal blocks transmitted from the first network entity, the one or more synchronization signal blocks transmitted from the second network entity, or any combination thereof, and wherein the transmission beam pattern is based at least in part on the report.

2. The method of claim 1, further comprising:
receiving the one or more synchronization signal blocks from the first network entity;
transmitting, to one or more wireless devices, the one or more synchronization signal blocks from the first network entity, the one or more synchronization signal blocks being transmitted during a set of periodic intervals; and
monitoring for the synchronization signal blocks from the second network entity during a monitoring interval based at least in part on the instructions.

3. The method of claim 2, further comprising:
receiving, as part of the instructions, an indication to refrain from transmitting the one or more synchronization signal blocks from the first network entity during an interval of the set of periodic intervals that overlaps with the monitoring interval.

4. The method of claim 2, wherein the monitoring interval is non-overlapping with the set of periodic intervals.

5. The method of claim 1, further comprising:
determining, based at least in part on detecting the one or more synchronization signal blocks from the second network entity, a set of properties associated with the one or more synchronization signal blocks from the second network entity; and
transmitting, within the report, an indication of the set of properties associated with the one or more synchronization signal blocks from the second network entity, the set of properties comprising a reference signal received power of the one or more synchronization signal blocks from the second network entity, an identity of the second network entity, a time offset for signals received from the second network entity, or any combination thereof.

6. The method of claim 1, further comprising:
identifying a first reception beam used to receive the one or more synchronization signal blocks transmitted from the first network entity during a first set of one or more symbol periods;
identifying a second reception beam used to receive the one or more synchronization signal blocks transmitted from the second network entity during a second set of one or more symbol periods; and
transmitting, within the report, an indication of the first reception beam, the second reception beam, the first set of one or more symbol periods, the second set of one or more symbol periods, or any combination thereof.

7. The method of claim 6, wherein the transmission beam pattern is based at least in part on the indication of the first reception beam, the second reception beam, the first set of one or more symbol periods, the second set of one or more symbol periods, or any combination thereof.

8. The method of claim 1, further comprising:
configuring reception beams of the wireless repeater for receiving, during a set of one or more symbol periods, the one or more synchronization signal blocks transmitted from the first network entity, the one or more synchronization signal blocks transmitted from the second network entity during a second set of one or more symbol periods, or any combination thereof, wherein the configured reception beams are based at least in part on the indication of the transmission beam pattern.

9. The method of claim 1, further comprising:
detecting one or more additional synchronization signal blocks from the first network entity based at least in part on the instructions; and
transmitting, within the report, an indication of the one or more additional synchronization signal blocks from the first network entity.

10. The method of claim 1, further comprising:
detecting the one or more synchronization signal blocks from the second network entity based at least in part on the instructions; and
performing an initialization procedure to connect with the second network entity based at least in part on the detected the one or more synchronization signal blocks from the second network entity.

11. The method of claim 1, wherein transmitting the report comprises:
transmitting the report in a portion of a bandwidth used to receive the one or more synchronization signal blocks from the first network entity.

12. The method of claim 1, wherein transmitting the report comprises:
transmitting the report in a first bandwidth that is different from a second bandwidth used to receive the one or more synchronization signal blocks from the first network entity.

13. The method of claim 1, wherein receiving the instructions comprises:
receiving, from the first network entity, control information comprising the instructions, wherein the control information is received in a portion of a bandwidth used to receive the one or more synchronization signal blocks from the first network entity.

14. The method of claim 1, wherein receiving the instructions comprises:
receiving, from the first network entity, control information comprising the instructions, wherein the control information is received in a first bandwidth that is different from a second bandwidth used to receive the one or more synchronization signal blocks from the first network entity.

15. The method of claim 1, wherein the transmission beam pattern corresponds to symbol periods during which the one or more synchronization signal blocks from the first network entity are transmitted, the one or more synchronization signal blocks from the second network entity are transmitted, or any combination thereof.

16. A method for wireless communication at a first network entity, comprising:
transmitting, to a wireless repeater, instructions to monitor for synchronization signal blocks from a second network entity;
receiving, from the wireless repeater, a report indicating that one or more synchronization signal blocks transmitted from the second network entity were detected based at least in part on the instructions; and
transmitting, to the wireless repeater, an indication of a transmission beam pattern for one or more synchronization signal blocks transmitted from the first network entity, the one or more synchronization signal blocks transmitted from the second network entity, or any combination thereof, wherein the transmission beam pattern is configured for forwarding the one or more synchronization signal blocks transmitted from the first network entity, the one or more synchronization signal blocks transmitted from the second network entity, or any combination thereof, and wherein the transmission beam pattern is based at least in part on the report.

17. The method of claim 16, further comprising:
determining, based at least in part on the report, a synchronization signal block pattern for the one or more synchronization signal blocks transmitted from the first network entity, the one or more synchronization signal blocks transmitted from the second network entity, or any combination thereof, wherein the transmission beam pattern corresponds to the synchronization signal block pattern.

18. The method of claim 17, wherein determining the synchronization signal block pattern comprises:
communicating with the second network entity to configure the synchronization signal block pattern based at least in part on the report.

19. The method of claim 16, further comprising:
configuring a monitoring interval to monitor for the synchronization signal blocks from the second network entity; and
transmitting, within the instructions, an indication of the monitoring interval.

20. The method of claim 19, further comprising:
determining a set of periodic intervals the wireless repeater uses for transmitting the one or more synchronization signal blocks from the first network entity;
identifying a collision between an interval of the set of periodic intervals and the monitoring interval; and
transmitting, as part of the instructions, an indication to refrain from transmitting the one or more synchronization signal blocks from the first network entity during the interval based at least in part on the identified collision.

21. The method of claim 19, further comprising:
determining a set of periodic intervals the wireless repeater uses for transmitting the one or more synchronization signal blocks from the first network entity, wherein the monitoring interval is non-overlapping with the set of periodic intervals.

22. The method of claim 16, further comprising:
receiving, within the report, an indication of a set of properties associated with the one or more synchronization signal blocks from the second network entity, the set of properties comprising a reference signal received power of the one or more synchronization blocks from the second network entity, an identity of the second network entity, a time offset for signals received from the second network entity, or any combination thereof.

23. The method of claim 16, further comprising:
receiving, within the report, an indication of a first reception beam and a first set of one or more symbol periods for receiving the one or more synchronization signal blocks transmitted from the first network entity and an indication of a second reception beam and a second set of one or more symbol periods for receiving the one or more synchronization signal blocks transmitted from the second network entity; and
determining the transmission beam pattern based at least in part on the indication of the first reception beam, the second reception beam, the first set of one or more symbol periods, the second set of one or more symbol periods, or any combination thereof.

24. The method of claim 16, wherein receiving the report comprises:

receiving the report in a portion of a bandwidth used to transmit the one or more synchronization signal blocks to the wireless repeater.

25. The method of claim 16, wherein receiving the report comprises:
receiving the report in a first bandwidth that is different from a second bandwidth used to transmit the one or more synchronization signal blocks to the wireless repeater.

26. The method of claim 16, wherein transmitting the instructions comprises:
transmitting control information comprising the instructions, wherein the control information is transmitted in a portion of a bandwidth used to transmit the one or more synchronization signal blocks to the wireless repeater.

27. The method of claim 16, wherein transmitting the instructions comprises:
transmitting control information comprising the instructions in a first bandwidth that is different from a second bandwidth used to transmit the one or more synchronization signal blocks to the wireless repeater.

28. The method of claim 16, wherein the transmission beam pattern corresponds to symbol periods during which the one or more synchronization signal blocks from the first network entity are transmitted, the one or more synchronization signal blocks from the second network entity are transmitted, or any combination thereof.

29. An apparatus for wireless communication at a wireless repeater, comprising:
a processor; and
a memory coupled with the processor, wherein the memory comprises instructions executable by the processor to cause the apparatus to:
receive, from a first network entity, instructions to monitor for synchronization signal blocks from a second network entity;
transmit, to the first network entity, a report indicating that one or more synchronization signal blocks transmitted from the second network entity were detected based at least in part on the instructions; and
receive, from the first network entity, an indication of a transmission beam pattern for one or more synchronization signal blocks transmitted from the first network entity, the one or more synchronization signal blocks transmitted from the second network entity, or any combination thereof, wherein the transmission beam pattern is configured for forwarding the one or more synchronization signal blocks transmitted from the first network entity, the one or more synchronization signal blocks transmitted from the second network entity, or any combination thereof, and wherein the transmission beam pattern is based at least in part on the report.

30. An apparatus for wireless communication at a first network entity, comprising:
a processor; and
a memory coupled with the processor, wherein the memory comprises instructions executable by the processor to cause the apparatus to:
transmit, to a wireless repeater, instructions to monitor for synchronization signal blocks from a second network entity;
receive, from the wireless repeater, a report indicating that one or more synchronization signal blocks transmitted from the second network entity were detected based at least in part on the instructions; and transmit, to the wireless repeater, an indication of a transmission beam pattern for one or more synchronization signal blocks transmitted from the first network entity, the one or more synchronization signal blocks transmitted from the second network entity, or any combination thereof, wherein the transmission beam pattern is configured for forwarding the one or more synchronization signal blocks transmitted from the first network entity, the one or more synchronization signal blocks transmitted from the second network entity, or any combination thereof, and wherein the transmission beam pattern is based at least in part on the report.

* * * * *